US011457468B2

(12) United States Patent
Lou et al.

(10) Patent No.: US 11,457,468 B2
(45) Date of Patent: Sep. 27, 2022

(54) COMMUNICATION METHOD, COMMUNICATIONS APPARATUS, AND SYSTEM

(71) Applicant: HUAWEI TECHNOLOGIES CO., LTD., Guangdong (CN)

(72) Inventors: Chong Lou, Shanghai (CN); Xing Liu, Shenzhen (CN); Qiang Fan, Hefei (CN); Jingrui Guo, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 38 days.

(21) Appl. No.: 17/034,639

(22) Filed: Sep. 28, 2020

(65) Prior Publication Data
US 2021/0014887 A1    Jan. 14, 2021

Related U.S. Application Data

(63) Continuation of application No. PCT/CN2019/080399, filed on Mar. 29, 2019.

(30) Foreign Application Priority Data

Mar. 30, 2018 (CN) .......................... 201810291743.7

(51) Int. Cl.
*H04W 72/04* (2009.01)
*H04W 72/12* (2009.01)
*H04W 72/14* (2009.01)

(52) U.S. Cl.
CPC ....... *H04W 72/14* (2013.01); *H04W 72/0446* (2013.01); *H04W 72/1268* (2013.01)

(58) Field of Classification Search
None
See application file for complete search history.

(56) References Cited

U.S. PATENT DOCUMENTS

| 2011/0170495 | A1* | 7/2011 | Earnshaw | ............ H04L 5/0091 |
| | | | | 370/329 |
| 2014/0177573 | A1 | 6/2014 | Han et al. | |
| 2017/0171882 | A1 | 6/2017 | Sundararajan et al. | |
| 2017/0273113 | A1 | 9/2017 | Tirronen et al. | |
| (Continued) | | | | |

FOREIGN PATENT DOCUMENTS

| CN | 102970761 A | 3/2013 |
| CN | 102984802 A | 3/2013 |
| (Continued) | | |

OTHER PUBLICATIONS

Huawei, HiSilicon, Remaining issues on LCP with Multiple Numerologies. 3GPP TSG-RAN WG2 #98, Hangzhou, China, May 15-19, 2017, R2-1705624, 3 pages.

*Primary Examiner* — Sai Aung
(74) *Attorney, Agent, or Firm* — Womble Bond Dickinson (US) LLP

(57) ABSTRACT

This application provides a communication method, a communications apparatus, and a system, to reduce a transmission delay of an emergency service. The method may include receiving an uplink grant. The method may also include determining, based on a time-domain position of an uplink grant resource indicated by the uplink grant, a first uplink grant resource used to transmit first service data. Furthermore, the method may include transmitting the first service data on the first uplink grant resource.

18 Claims, 9 Drawing Sheets

(56) References Cited

U.S. PATENT DOCUMENTS

| | | | |
|---|---|---|---|
| 2018/0279358 A1* | 9/2018 | Babaei | H04W 72/14 |
| 2018/0368133 A1* | 12/2018 | Park | H04L 5/00 |
| 2019/0052414 A1* | 2/2019 | Babaei | H04L 5/0094 |
| 2019/0068317 A1* | 2/2019 | Babaei | H04W 72/0446 |
| 2019/0075589 A1* | 3/2019 | Jeon | H04L 1/08 |

FOREIGN PATENT DOCUMENTS

| | | |
|---|---|---|
| CN | 103298130 A | 9/2013 |
| CN | 105407524 A | 3/2016 |
| CN | 106961741 A | 7/2017 |
| EP | 3361791 A1 | 8/2018 |
| WO | 2017071557 A1 | 5/2017 |

* cited by examiner

COMMUNICATION METHOD, COMMUNICATIONS APPARATUS, AND SYSTEM

CROSS-REFERENCE TO RELATED APPLICATIONS

This application is a continuation of International Application No. PCT/CN2019/080399, filed on Mar. 29, 2019, which claims priority to Chinese Patent Application No. 201810291743.7, filed on Mar. 30, 2018. The disclosures of the aforementioned applications are hereby incorporated by reference in their entireties.

TECHNICAL FIELD

This application relates to the communications field, and more specifically, to a communication method, a communications apparatus, and a system.

BACKGROUND

In some communications systems, for example, a long term evolution (LTE) communications system and a new radio access technology (NR) in a 5th generation (5G) communications system, a network device may configure one or more logical channels (LCH) for a terminal device because there are a plurality of service requirements. Each logical channel may correspond to a quality of service (QoS) requirement of one service. For example, the terminal device may need both an interne access service and a voice service (for example, Voice over LTE, VoLTE, or the like), and therefore may be configured with two different logical channels to receive or send data of different services.

Currently, there is a method: The terminal device may perform resource mapping based on a sequence of receiving uplink grants (UL grant). Specifically, the network device may indicate a granted physical uplink resource (referred to as an uplink grant resource for short below) to the terminal device via downlink control information. Each uplink grant may correspond to one uplink grant resource. The terminal device may determine a resource mapping sequence based on the sequence of receiving the uplink grants, and map, based on the resource mapping sequence, data on a logical channel to a corresponding uplink grant resource for sending.

However, some delay-sensitive services, such as an ultra-reliable and low-latency communications (URLLC) service, the industrial internet service, and a deterministic network (DetNet) service, have a relatively high delay requirement. In the foregoing method, delay-sensitive characteristics of these services are not fully considered. If the foregoing method is used to process these services, there may be a relatively large transmission delay.

SUMMARY

In view of this, this application provides a communication method, a communications apparatus, and a system, to reduce a transmission delay.

According to a first aspect, a communication method is provided, including:

receiving, by a terminal device, an uplink grant;

determining, based on a time-domain position of an uplink grant resource indicated by the uplink grant, a first uplink grant resource used to transmit first service data; and transmitting the first service data on the first uplink grant resource.

Correspondingly, a network device sends the uplink grant, where the uplink grant indicates a time-domain position of the uplink grant resource.

It should be understood that the uplink grant is not limited to indicating the time-domain position of the uplink grant resource, and may be further used to indicate information such as a frequency-domain position of the uplink grant resource, a resource size, and a modulation and coding scheme (MCS). This is not limited in this embodiment of this application.

Based on the foregoing technical solution, the terminal device can select, based on the time-domain position of the uplink grant resource, the appropriate first uplink grant resource to send the first service data. This is different from prior approaches, and the terminal device does not depend on an arrival moment of uplink scheduling to determine a resource used to transmit the first service data; instead, a time-domain position of the resource is considered, in other words, a moment for sending the first service data is considered. In this way, the appropriate resource can be selected to transmit the delay-sensitive first service data, and a transmission delay can be reduced. In addition, the technical solution is not only applicable to a dynamically scheduled uplink grant resource, but also applicable to a preconfigured uplink grant resource.

With reference to the first aspect, in some embodiments of the first aspect, the determining, based on a time-domain position of an uplink grant resource indicated by the uplink grant, a first uplink grant resource used to transmit first service data includes:

determining first remaining time of the uplink grant resource based on a time-domain end position of the uplink grant resource indicated by the uplink grant, where the first remaining time is a time interval between the time-domain end position of the uplink grant resource and a timeout moment for the first service data; and determining the first uplink grant resource from the uplink grant resource, where first remaining time of the first uplink grant resource is greater than or equal to a delay threshold that is preconfigured.

In this case, the terminal device can select the first uplink grant resource based on a delay requirement of the first service data, and the determined first uplink grant resource can ensure that a transmission delay of the first service data meets the delay requirement.

With reference to the first aspect, in some embodiments of the first aspect, the method further includes:

receiving indication information of the delay threshold.

Correspondingly, the network device sends the indication information of the delay threshold.

With reference to the first aspect, in some embodiments of the first aspect, the first uplink grant resource is a resource at a foremost time-domain position in a plurality of uplink grant resources.

In this case, the terminal device can transmit the first service data on the uplink grant resource at the foremost time-domain position. In other words, the first service data is first sent, so that a transmission delay of the first service data is minimized.

With reference to the first aspect, in some embodiments of the first aspect, the determining, based on a time-domain position of an uplink grant resource indicated by the uplink grant, a first uplink grant resource used to transmit first service data includes:

determining second remaining time of a plurality of uplink grant resources based on time-domain start positions of the plurality of uplink grant resources indicated by a plurality of uplink grants, where the second remaining time is a time interval between a time-domain start position of a uplink grant resource and a start moment for performing logical channel prioritization (LCP) on a logical channel on which the first service data is located; and determining the first uplink grant resource from the plurality of uplink grant resources, where the first uplink grant resource is a resource with minimum second remaining time in the plurality of uplink grant resources.

The resource with the minimum second remaining time is a resource at a foremost time-domain position. In other words, the first service data is first sent, so that a transmission delay of the first service data is minimized.

With reference to the first aspect, in some embodiments of the first aspect, the determining, based on a time-domain position of an uplink grant resource indicated by the uplink grant, a first uplink grant resource used to transmit first service data includes:

determining first remaining time of a plurality of uplink grant resources based on time-domain end positions of the plurality of uplink grant resources indicated by a plurality of uplink grants, where the first remaining time is a time interval between a time-domain end position of a uplink grant resource and a timeout moment before the first service data is correctly received;

determining a plurality of candidate uplink grant resources from the plurality of uplink grant resources, where first remaining time of the candidate uplink grant resources is greater than or equal to a delay threshold that is preconfigured; and determining the first uplink grant resource from the plurality of candidate uplink grant resources, where the first uplink grant resource is a resource at a foremost time-domain position in the plurality of candidate uplink grant resources.

In this case, when the first uplink grant resource is used to transmit the first service data, a delay requirement of the first service data can be met and a transmission delay is minimized.

With reference to the first aspect, in some embodiments of the first aspect, a quantity of bits that can be transmitted on the first uplink grant resource is greater than or equal to a size of the first service data, and the transmitting the first service data on the first uplink grant resource includes:

transmitting all of the first service data on the first uplink grant resource.

During segmented transmission, entire data may not be obtained because the data carried on one or more resources for transmission fails. In this case, retransmission is to be performed to resolve the problem. Consequently, a particular transmission delay may be caused. When an uplink grant resource that can be used to transmit a quantity of bits greater than or equal to the size of the first service data is selected to transmit the first service data, the transmission delay can be further reduced.

With reference to the first aspect, in some embodiments of the first aspect, a quantity of bits that can be transmitted on the first uplink grant resource is less than a size of the first service data, segmented transmission of the first service data is supported, and the transmitting the first service data on the first uplink grant resource includes:

transmitting a part of the first service data on the first uplink grant resource.

With reference to the first aspect, in some embodiments of the first aspect, the method further includes:

transmitting a part or all of remaining data in the first service data on a second uplink grant resource, where the remaining data in the first service data is data not sent on the first uplink grant resource; the second uplink grant resource is a resource with minimum second remaining time in the plurality of uplink grant resources other than the first uplink grant resource, or the second uplink grant resource is a resource corresponding to an uplink grant that first arrives in the plurality of uplink grant resources other than the first uplink grant resource; and the second remaining time is a time interval between a time-domain start position of a uplink grant resource and the start moment for performing LCP for the first service data.

In other words, when segmented transmission of the first service data is supported, the first service data may be transmitted on one or more uplink grant resources.

According to a second aspect, a communication method is provided, including:

receiving, by a terminal device, an uplink grant;

determining a first uplink grant resource from an uplink grant resource indicated by the uplink grant, where a quantity of bits that can be transmitted on the first uplink grant resource is greater than or equal to a size of a first service data; and transmitting the first service data on the first uplink grant resource.

Correspondingly, a network device sends the uplink grant, where the uplink grant indicates a size of the uplink grant resource.

The terminal device may determine, based on the size of the uplink grant resource, the quantity of bits that can be transmitted, further determine a resource that can be used to transmit a quantity of bits greater than or equal to the size of the first service data as the first uplink grant resource, and transmit the first service data on the first uplink grant resource. In this case, the terminal device can use enough resources to send all of the first service data. This can avoid a transmission delay that may be caused due to segmented transmission, and help reduce the transmission delay.

With reference to the first aspect or the second aspect, in some embodiments, the method further includes:

receiving, by the terminal device, first indication information, where the first indication information indicates whether segmented transmission of the first service data is supported.

Correspondingly, the network device sends the first indication information, where the first indication information indicates whether segmented transmission of the first service data is supported.

With reference to the first aspect or the second aspect, in some embodiments, the first indication information is carried in a logical channel configuration information element of the first service data, and the first indication information is carried in a segmentation field.

With reference to the first aspect or the second aspect, in some embodiments, the first service data meets one or more of the following:

a prioritized bit rate (PBR) of the first service data is infinity;

a value of a priority of the first service data is less than or equal to a preset threshold; or the first service data is high-priority data.

With reference to the first aspect or the second aspect, in some embodiments, a priority field for the first service data is carried in the logical channel configuration information element, and the priority field indicates the value of the priority of the first service data.

With reference to the first aspect or the second aspect, in some embodiments, a high priority field for the first service data is carried in the logical channel configuration information element, and the high priority field indicates that the first service data is the high-priority data.

With reference to the first aspect or the second aspect, in some embodiments, a prioritized bit rate (PBR) field for the first service data is carried in the logical channel configuration information element, and the PBR field indicates that the PBR on the first logical channel is infinity.

Whether service data carried on a logical channel is data of an emergency service may be indicated in any one of the foregoing manners.

With reference to the first aspect or the second aspect, in some embodiments, the uplink grant resource is a dynamically scheduled resource, or the uplink grant resource is a preconfigured resource.

According to a third aspect, this application provides a communications apparatus. The communications apparatus has a function of implementing behavior of the terminal device in the foregoing method aspects. The communications apparatus includes corresponding units or means configured to perform the steps or functions described in the foregoing method aspects. The steps or functions may be implemented by software, hardware, or a combination of hardware and software.

According to a fourth aspect, this application provides a communications apparatus, including at least one processor and memory, where the at least one processor is configured to perform the method provided in the first aspect or the second aspect.

According to a fifth aspect, this application provides a communications apparatus, including at least one processor and interface circuit, where the at least one processor is configured to perform the method provided in the first aspect or the second aspect.

According to a sixth aspect, this application provides a program. A processor executes the program, to perform the method provided in the first aspect or the second aspect.

According to a seventh aspect, this application provides a program product, for example, a computer-readable storage medium, where the program product includes the program in the sixth aspect.

DESCRIPTION OF EMBODIMENTS

The following describes the technical solutions of this application with reference to the accompanying drawings.

The technical solutions in the embodiments of this application may be applied to various communications systems, for example, but not limited to a narrowband internet of things (NB-IoT) system, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a Worldwide Interoperability for Microwave Access (WiMAX) communications system, a future 5th Generation (5G) system, or a next-generation radio access technology (NR).

Figure 1:
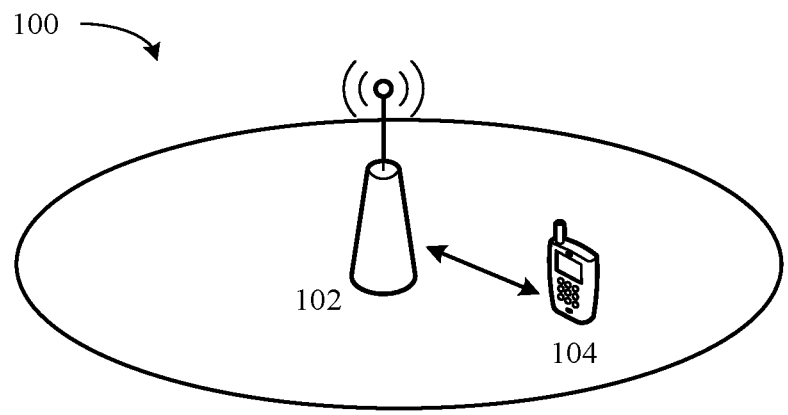
FIG. 1 is a schematic diagram of a communications system to which the embodiments of this application are applicable.

First, for ease of understanding the embodiments of this application, a communications system shown in FIG. 1 is used as an example to describe in detail a communications system to which the embodiments of this application are applicable. FIG. 1 is a schematic diagram of a communications system 100 to which a communication method in the embodiments of this application is applicable. As shown in FIG. 1, the communications system 100 may include at least one network device (for example, a network device 102 shown in the figure) and at least one terminal device (for example, a terminal device 104 shown in the figure). The network device 102 may communicate with the terminal device 104. Optionally, the communications system 100 may include more network devices and/or more terminal devices. This is not limited in this application.

The network device may be any device having a wireless transceiver function. The device includes but is not limited to: an evolved NodeB (eNB), a radio network controller (RNC), a NodeB (NB), a base station controller (BSC), a base transceiver station (BTS), a home base station (for example, a Home evolved NodeB, or a Home NodeB, HNB), a baseband unit (BBU), an access point (AP) in a wireless fidelity (Wi-Fi) system, a wireless relay node, a wireless backhaul node, a transmission point (transmission and reception point (TRP) or transmission point (TP)), or the like. The device may be a gNB or a transmission point (TRP or TP) in a 5G system, for example, an NR system, or one antenna panel or a group of antenna panels (including a plurality of antenna panels) of a base station in a 5G system, or may be a network node, such as a baseband unit (BBU) or a distributed unit (DU), that constitutes a gNB or a transmission point.

In some deployments, a gNB may include a centralized unit (CU) and a DU. The gNB may further include a radio frequency unit (RU). The CU implements part of functions of the gNB, and the DU implements the other part of functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is obtained by converting information at the PHY layer. Therefore, in the architecture, higher layer signaling, for example, RRC layer signaling, may also be considered as being sent by the DU or sent by the DU and the CU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, a user apparatus, or the like. The terminal device in the embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application.

In the communications system 100, the network device 102 may communicate with a plurality of terminal devices (for example, including the terminal device 104 shown in the figure). The terminal device 104 may also communicate with a plurality of network devices (for example, including the network device 102 shown in the figure), or the terminal device 104 may also communicate with one or more other terminal devices. A scenario in which the network device 102 shown in FIG. 1 communicates with the terminal device 104 shown in FIG. 1 is merely a possible scenario to which the communication method provided in this application is applicable. The communication method provided in this application may be further applicable to more scenarios, for example, a coordination multiple point (CoMP) transmission scenario, a device to device (D2D) communication scenario, and a Vehicle to Everything (V2X) communication scenario. FIG. 1 merely shows an example for ease of understanding, and the scenarios are not drawn.

Figure 2:
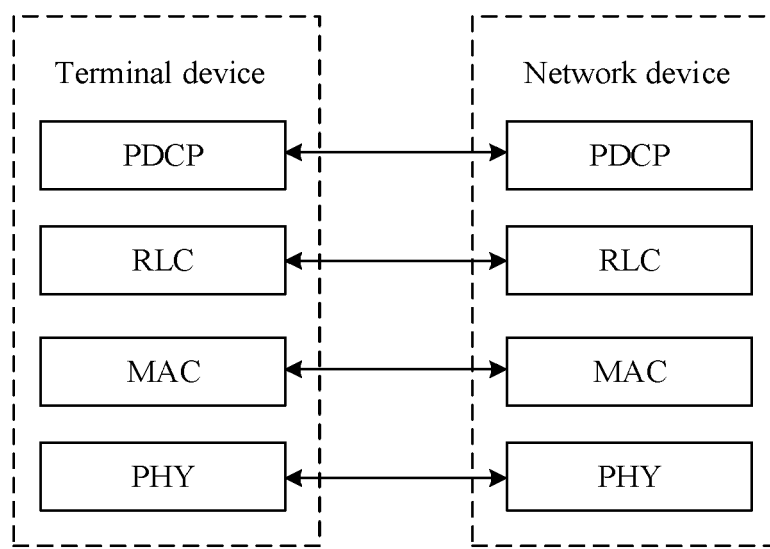
FIG. 2 is a schematic structural diagram of a protocol stack in LTE.

For ease of understanding the embodiments of this application, the following briefly describes a protocol stack structure in LTE with reference to FIG. 2. FIG. 2 is a schematic structural diagram of a user plane protocol stack in LTE. As shown in the figure, a current user plane protocol stack structure in LTE may include four protocol layers that may be a packet data convergence protocol (PDCP) layer, a radio link control (RLC) layer, a media access control (MAC) layer, and a physical (PHY) layer from top to bottom. Data generated by a transmit end device at any protocol layer (where the protocol layer is, for example, denoted as a protocol layer A, and it may be understood that the protocol layer A may be a PDCP layer, an RLC layer, a MAC layer, or a PHY layer) is to be processed by a protocol layer lower than the protocol layer A, and finally sent to a receive end device through a physical channel. Correspondingly, data received by the receive end device through the physical channel is also to be processed by a PHY layer and a protocol layer higher than the PHY layer, and the data can be obtained at the protocol layer A after the data is processed by the protocol layer A.

It should be understood that the figure merely shows an example, and should not constitute any limitation on this application. For example, a control plane protocol stack in LTE may further include a radio resource control (RRC) layer and a non-access stratum that are above a PDCP layer.

It should be further understood that, for ease of understanding, the foregoing protocol stack in LTE is merely used as an example for description, and should not constitute any limitation on this application. This application does not exclude a possibility of combining one or more layers in the protocol stack in LTE or adding one or more protocol layers to the protocol stack in LTE for a future protocol. For example, in a user plane protocol stack in an NR protocol, a new protocol layer, for example, a service data adaptation protocol (SDAP) layer, may be added above the PDCP layer.

With reference to the protocol stack shown in FIG. 2, the following briefly describes, by using uplink transmission as an example, data processed by the terminal device at each protocol layer.

First, the terminal device may perform, at the PDCP layer, header compression on an internet protocol (IP) data packet from an upper layer or on a protocol data unit (PDU) of the SDAP layer (referred to as a SDAP PDU for short) in an NR system, to decrease a quantity of bits transmitted through a wireless interface, and may further encrypt the data packet to generate a PDU of the PDCP layer (referred to as a PDCP PDU for short) and send the PDCP PDU to the RLC layer.

Next, the terminal device may segment or concatenate, at the RLC layer, a data packet from the PDCP layer, to generate an RLC PDU, and send the RLC PDU to the MAC layer, where the RLC layer may provide a service for the PDCP layer. Alternatively, in the NR system, the terminal device may not concatenate data packets from an upper layer.

Then, the terminal device may determine, at the MAC layer, a sending format for an air interface, for example, a size of a data block, a physical resource that matches the size of the data block, and an MCS that matches the physical resource. The terminal device may generate, based on the MCS, a MAC PDU (namely, a transport block (TB)) whose size matches the data block, and send the MAC PDU to the physical layer, where the MAC layer may provide a service for the RLC layer in a form of a logical channel. In addition, MAC layer control information may be further generated at the MAC layer, for example, a MAC control element (CE) used to report data buffer information, power headroom, or the like, and the information may be used for scheduling by a base station. Therefore, the MAC PDU generated at the MAC layer may further include the MAC layer control information. This is not limited in this application.

Then, the terminal device may perform, at the physical layer, processing such as channel coding, rate matching, interleaving, scrambling, and modulation on the transport block (TB) from the MAC layer, and transmit, through an antenna, a signal generated through modulation, where the physical layer may provide a service for the MAC layer in a form of a transport channel (TCH).

It should be understood that the foregoing example briefly describes, with reference to the protocol stack structure in LTE, operations performed by the terminal device on uplink data at each protocol layer. Processing performed by a network device side on downlink data is similar to the foregoing processes. In addition, processing performed by the terminal device on downlink data and processing performed by the network device on uplink data are opposite to the foregoing processes. Details are not described again. Specific implementation processes of the foregoing processes may be the same as those used by prior approaches. For brevity, details of the specific processes are not described herein.

To meet a plurality of service requirements of a terminal device, a network device may configure one or more logical channels for each terminal device, and each logical channel may correspond to a QoS requirement of one service. For example, the terminal device may need both an internet access service and a voice service, and therefore may be configured with two or more different logical channels to receive or send data of different services.

An uplink data sending process is used as an example. Independent entities may be respectively established at the PDCP layer and the RLC layer for processing data of different services, and the data of different services each corresponds to one logical channel. As described above, the MAC layer control information may be generated at the MAC layer, and a corresponding logical channel may be allocated for the MAC layer control information. A MAC entity may multiplex one or more logical channels onto one transport channel, and map a protocol data unit (PDU) (that is, an RLC PDU) from the RLC layer and/or the MAC layer control information to a same PDU at the MAC layer (that is, a MAC PDU). In this way, a plurality of logical channels can be multiplexed onto a same transport channel through the mapping.

Figure 3:
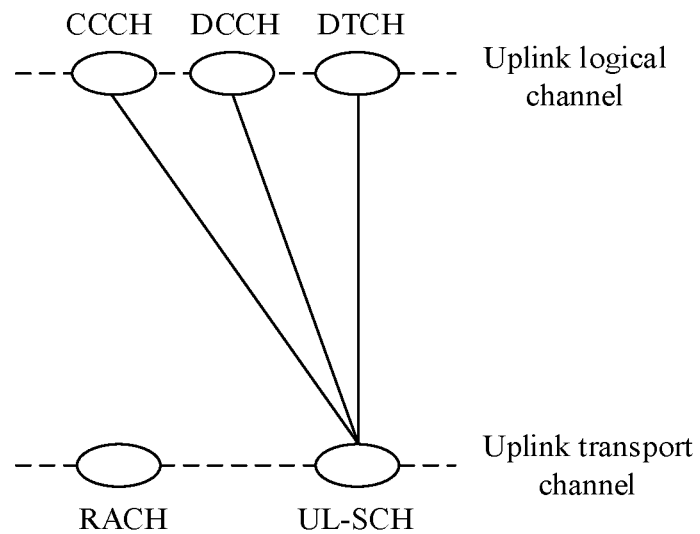
FIG. 3 is a schematic diagram of multiplexing a plurality of logical channels onto a same transport channel.

FIG. 3 is a schematic diagram of multiplexing a plurality of logical channels onto a same transport channel. Specifically, FIG. 3 shows an example in which a plurality of logical channels are multiplexed onto one transport channel in uplink transmission. As shown in the figure, a MAC entity may multiplex a plurality of logical channels including a common control channel (CCCH), a dedicated control channel (DCCH), and a dedicated traffic channel (DTCH) onto an uplink shared channel (UL-SCH).

Figure 4:
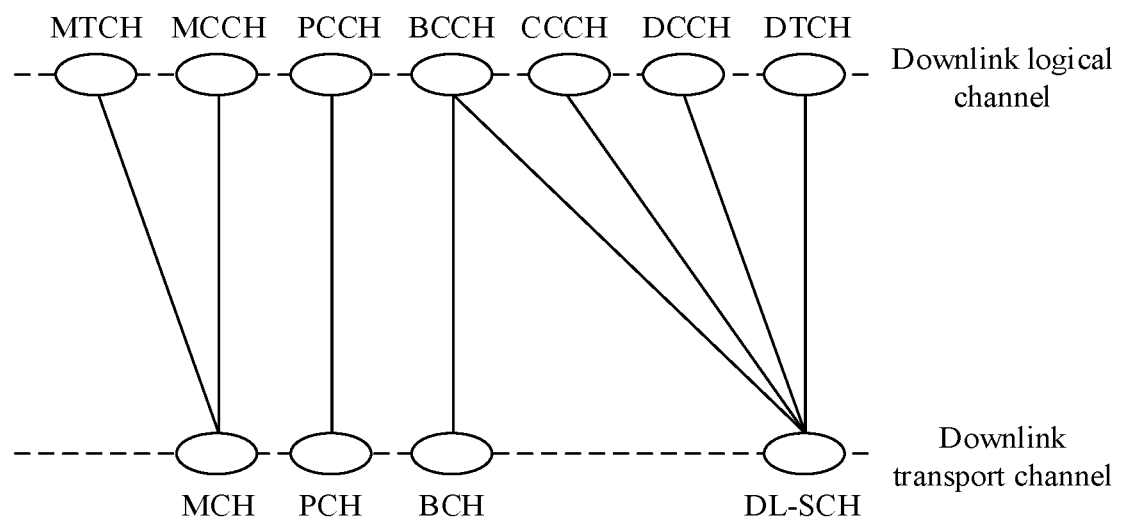
FIG. 4 is a schematic diagram of multiplexing a plurality of logical channels onto a same transport channel.

FIG. 4 is another schematic diagram of multiplexing a plurality of logical channels onto a same transport channel. Specifically, FIG. 4 shows an example in which a plurality of logical channels are multiplexed onto one transport channel in downlink transmission. As shown in the figure, a MAC entity may multiplex a plurality of logical channels including a CCCH, a DCCH, a DTCH, and a broadcast control channel (BCCH) onto a downlink shared channel (DL-SCH), or may multiplex a plurality of logical channels including a multicast traffic channel (MTCH) and a multicast control channel (MCCH) onto a multicast channel (MCH).

It should be understood that FIG. 3 and FIG. 4 merely show examples provided for ease of understanding the case in which a plurality of logical channels are multiplexed onto a same transport channel, and should not constitute any limitation on this application.

For ease of understanding the embodiments of this application, the following briefly describes several terms in this application.

1. Logical channel prioritization (LCP): A MAC entity places data on one or more logical channels in a same MAC PDU, and performs LCP processing, to multiplex the data on the one or more logical channels onto the same MAC PDU.

When there is new data to be transmitted, the MAC entity selects an appropriate logical channel for each uplink grant resource. In NR, a physical resource may support a plurality of parameters such as a configuration parameter (numerology) and transmission duration, and the MAC layer may determine a matched logical channel based on parameters of each uplink grant resource such as a numerology and transmission duration.

The numerology is a concept newly introduced in NR, and may be specifically understood as a set of parameters used in a communications system. For example, the numerology may include a subcarrier spacing (SCS), a symbol length, a cyclic prefix (CP) length, and the like. One cell may support one or more numerologies, and the numerology may be applicable to a same time domain and/or frequency domain resource or different time domain and/or frequency domain resources. It should be understood that specific content included in the numerology enumerated herein is merely used as an example for description, and should not constitute any limitation on this application. For example, the numerology may further include a parameter at another granularity that can be supported in NR.

One uplink grant resource may match one or more logical channels, and only one MAC PDU is mapped to the uplink grant resource. However, there may be a plurality of multiplexed logical channels. This requires that a priority is to be allocated to each logical channel. The MAC entity may map data on the logical channels to the MAC PDU in descending order of priorities of the logical channels.

In a possible design, the priority of each logical channel may be indicated in a priority field in a logical channel configuration (LogicalChannelConfig) information element (IE) in radio resource control (RRC) signaling. A smaller value in the priority field indicates a higher priority of a corresponding logical channel.

In this allocation manner, a logical channel with a high priority may always occupy an allocated uplink grant resource. Consequently, there are not enough resources to carry a logical channel with a low priority. In other words, because no resource is allocated, data on the logical channel with a low priority cannot be transmitted in time, or the logical channel with a low priority is "starved".

To reduce a "starvation" case occurring on the logical channel with a low priority, a concept of a prioritized bit rate is proposed in LTE. To be specific, before a resource is allocated to each logical channel, a data rate is configured for each logical channel, to ensure that a minimum data rate is provided for each logical channel. Therefore, the "starvation" case occurring on the logical channel with a low priority is reduced.

In a possible design, a prioritized bit rate of each logical channel may be indicated in a prioritized bit rate (PrioritisedBitRate) field in the logical channel configuration information element in the RRC signaling.

The MAC entity may implement MAC multiplexing by using a method similar to a token bucket algorithm. A basic idea of the algorithm is as follows: Whether data on a logical channel is to be sent is determined based on whether a token is included in a token bucket and a quantity of tokens included in the token bucket, and an amount of data, assembled in the MAC PDU, on the logical channel is controlled.

Bucket size duration (BSD) determines a "depth" of the token bucket. The bucket size duration and the PBR jointly determine a maximum capacity PBR×BSD of the token bucket. The maximum capacity of the token bucket limits a total amount of data that can be pending on each logical channel, namely, a total amount of data buffered in a buffer.

A terminal device may maintain a variable Bj for each logical channel j. The variable indicates a quantity of tokens currently available in the token bucket, and each token corresponds to one byte of data. A token herein may be understood as a permission for mapping data on a logical channel to a transport channel. Bj is initialized to 0 when the logical channel is established, and is increased by PBR×T for each time unit T. For example, if a PBR indicated in a PrioritisedBitRate field for a logical channel is kBps8, the PBR is 8 kilobytes per second (kBps). To be specific, 8 bytes (8 kBps×1 ms=8 Bytes) of tokens can be placed into the token bucket for each time unit T. A value of Bj cannot exceed the maximum capacity PBR×BSD of the bucket (BSD=500 ms is used as an example, and the maximum capacity is 8 kBps×500 ms=4 kBytes). The time unit T may be any value. This is not limited in this application.

The terminal device may perform LCP according to the following steps:

Step 1: For all logical channels with Bj>0, perform packet assembly in descending order of priorities, where a radio resource allocated to each logical channel meets a PBR requirement. When a PBR of a logical channel is configured as infinity, only after enough resources are allocated to the logical channel, it is considered that a resource is allocated to a logical channel having a lower priority than the logical channel is considered.

Step 2: Subtract, from Bj, sizes of all MAC SDUs on the logical channel j that are multiplexed onto an MAC PDU in step 1. In a possible embodiment, for the logical channel j, each time one RLC SDU is transmitted, whether Bj is greater than 0 is first compared. If Bj is greater than 0, the SDU is added to the MAC PDU. Then, a size $T_{sdu}$ of the SDU is subtracted from Bj, and whether a PBR requirement is met is determined. This is repeated until Bj is less than 0 or a PBR requirement of the logical channel j is met. Then, a next logical channel is processed.

Step 3: If there is a remaining uplink resource after the foregoing two steps are completed, regardless of a magnitude of Bj, the remaining resource is allocated to logical channels in descending order of priorities of the logical channels. A logical channel with a low priority can be served only when there is a remaining uplink grant resource after data on all logical channels with a priority higher than the low priority is sent. In this case, UE maximizes transmission of the data on a logical channel with a high priority.

In addition, the terminal device further complies with the following principles: (1) If the entire RLC SDU can be filled in the remaining resource, the terminal device should not segment the SDU. (2) If the terminal device segments an RLC SDU on the logical channel, the terminal device should fill a segment as large as possible in the remaining resource based on a size of the remaining resource. (3) The terminal device should maximize transmission of data. (4) If a radio bearer is pending, the terminal device should not transmit data on a logical channel corresponding to the radio bearer.

If PBRs of all logical channels are set to 0 kBps, packet assembly is performed strictly in a priority order. In this case, the terminal device maximally satisfies transmission of data with a higher priority.

2. Deterministic network (DetNet): The deterministic network is defined relative to a common network, requires a very low packet loss rate for a data flow, has definite restrictions on a packet loss, jitter, and high reliability, and has a controlled delay. Services that require a deterministic network may include, for example, industrial control and audio/video services. The industrial control service has a small data amount but a large quantity of data flows, and is delay-sensitive, and the audio/video service has very high requirements on a delay and jitter. For example, it is required that a delay range from 1 ms to 10 ms and transmission reliability reach 99.9999% or even 99.999999%. The deterministic network is clearly defined in the institute of electrical and electronics engineers (IEEE) 802.1 protocol.

3. URLLC: The URLLC may be understood as a type of service that requires a deterministic network. The URLLC service is usually an emergency service, and has a very high requirement on transmission reliability and a transmission delay. Generally, it is required that the delay range from 1 ms to 50 ms and the transmission reliability range from 99.9% to 99.9999%.

In an embodiment of this application, for ease of description, a service transmitted through the deterministic network is referred to as an emergency service or a deterministic service. It should be understood that specific content of the deterministic service is not limited in this application.

In prior approaches, when a terminal device needs to send uplink data, the terminal device may notify a network device via a scheduling request (SR) and a buffer status report (BSR), to request a physical uplink resource. The network device may schedule one or more physical uplink resources for the terminal device. The one or more physical uplink resources may indicate a modulation and coding scheme (MCS) and resource allocation via an uplink grant (UL grant). Alternatively, the terminal device may receive RRC signaling from the network device. The RRC signaling may include information such as a periodicity of a semi-persistent uplink grant resource. After receiving physical layer signaling that includes an uplink grant, the terminal device may activate the semi-persistent uplink grant resource, and the terminal device does not need to request the network device to allocate an uplink grant resource each time the terminal device sends uplink data.

In the foregoing two manners of scheduling an uplink grant resource, both the uplink grants may be physical layer signaling, for example, downlink control information. A MAC entity may determine a resource mapping sequence based on a sequence of receiving the uplink grants.

Figure 5:
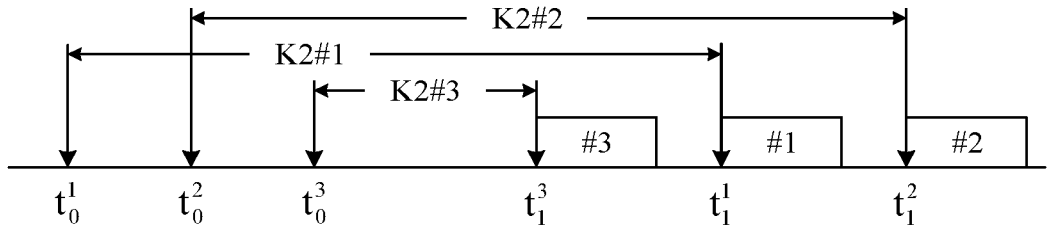
FIG. 5 shows moments at which three uplink grants are received and time-domain positions of three uplink grant resources indicated by the three uplink grants.

For ease of description, FIG. 5 shows moments at which three uplink grants are received and time-domain positions of three uplink grant resources indicated by the three uplink grants. As shown in the figure, for ease of differentiation and description, the three uplink grant resources may be respectively denoted as a resource #1, a resource #2, and a resource #3, and time-domain start positions of the three uplink grant resources may be respectively denoted as, $t_1^2$, and $t_1^3$. The uplink grants corresponding to the three uplink grant resources may be respectively denoted as an uplink grant #1, an uplink grant #2, and an uplink grant #3, and arrival moments of the three uplink grants (or the moments at which the three uplink grants are received) may be respectively denoted as $t_0^1$, $t_0^2$, and $t_3^0$.

It is assumed that an arrival sequence of the uplink grants is as follows: The uplink grant #1 arrives before the uplink grant #2, and the uplink grant #2 arrives before the uplink grant 3, that is, $t_0^1$, $t_0^2$, $t_0^3$. A sequence of time-domain start moments of the three uplink grant resources is as follows: A start moment of the resource #3 is before a start moment of the resource #1, and the start moment of the resource #1 is before a start moment of the resource #2, that is, $t_1^3 < t_1^1 < t_1^2$. A time interval between a time-domain start position of an uplink grant resource and an arrival moment of an uplink grant may be represented by a parameter K2. K2 may represent a slot offset from a time-domain start position of the uplink grant resource relative to a moment for receiving the uplink grant. For ease of differentiation, time intervals corresponding to the three uplink grants may be respectively denoted as K2 #1, K2 #2, and K2 #3. In this case, the time intervals K2 corresponding to the three uplink grants and shown in the figure meet K2 #3<K2 #1 and K2 #3<K2 #2. Generally, the terminal device may perform packet assembly and resource mapping at a MAC layer based on an arrival sequence of the uplink grants. In other words, after receiving an uplink grant, the MAC entity performs packet assembly on an uplink grant resource indicated by the uplink grant. In this case, data of an emergency service may be mapped to a MAC PDU corresponding to the resource #1. However, the resource #1 is actually located after the resource #3 in time domain. Consequently, the data of the emergency service cannot be sent in time, and an unnecessary delay is caused, or even a delay requirement of the service may not be met.

It should be understood that all the uplink grants shown in the figure may be downlink control information used for dynamic scheduling, or may be downlink control information used to activate a preconfigured resource. Alternatively, a part of the uplink grants may be downlink control information used for dynamic scheduling, and another part of the uplink grants may be downlink control information used to activate a preconfigured resource. This is not limited in the embodiments of this application. In view of this, this application provides a communication method, to reduce a transmission delay.

The following describes the embodiments of this application in detail with reference to the accompanying drawings.

It should be noted that, in an embodiment of this application, an "uplink grant" may be understood as signaling used to schedule a physical uplink resource, for example, downlink control information used for uplink granting, radio resource control (RRC) signaling used for semi-persistent configuration, downlink control information used to activate an uplink grant resource in a semi-persistent configuration manner, or the like. An "uplink grant resource" may be understood as a resource indicated by an uplink grant. In an LTE or NR protocol, the "uplink grant" and the "uplink grant resource" each may correspond to a UL grant, and a person skilled in the art may understand meanings of the "uplink grant" and the "uplink grant resource".

It should be further noted that, in an embodiment of this application, "predefinition" may be implemented by pre-storing corresponding code or a table in a device (for example, a terminal device or a network device) or in another manner that can be used to indicate related information. A specific embodiment of the "predefinition" is not limited in this application. For example, predefinition may be definition in a protocol.

It should be further noted that "storage" in an embodiment of this application may be storage in one or more memories. The one or more memories may be separately disposed, or may be integrated into an encoder or a decoder, a processor, or a communications apparatus. Alternatively, a part of the one or more memories may be separately disposed, and a part of the one or more memories are integrated into a decoder, a processor, or a communications apparatus. The memory may be a storage medium in any form. This is not limited in this application.

It should be further noted that a "protocol" may be a standard protocol in the communications field, for example, may include an LTE protocol, an NR protocol, and a related protocol applied to a future communications system. This is not limited in this application.

It should be further noted that, in the following embodiments, terms such as first and second are merely intended to differentiate between different objects, and should not constitute any limitation on this application.

It should be noted that the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. "At least one" means "one" or "more". "At least one of A and B", similar to "A and/or B", describes an association relationship between associated objects and represents that three relationships may exist. For example, at least one of A and B may represent the following three cases: Only A exists, both A and B exist, and only B exists.

It should be understood that the communication method provided in this application may be applicable to a wireless communications system, for example, the wireless communications system 100 shown in FIG. 1. There is a wireless communication connection between two communications apparatuses in the wireless communications system. One of the two communications apparatuses may correspond to the terminal device 104 shown in FIG. 1, for example, may be the terminal device 104 in FIG. 1, or may be a chip configured in the terminal device 104. The other one of the two communications apparatuses may correspond to the network device 102 shown in FIG. 1, for example, may be the network device 102 in FIG. 1, or may be a chip configured in the network device 102.

Without loss of generality, the following describes an embodiment of this application in detail by using an interaction process between a terminal device and a network device as an example. It may be understood that any terminal device in the wireless communications system may communicate, by using a same method, with one or more network devices having a wireless communication connection. This is not limited in the embodiments of this application.

In the following embodiments, it is assumed that an uplink grant resource indicated by an uplink grant received by a terminal device is a resource that matches a logical channel carrying first service data. The terminal device may determine, by using a method used by prior approaches, a resource that matches the logical channel carrying the first service data. For example, the terminal device determines a corresponding uplink grant resource based on some information about the logical channel carrying the first service data, for example, parameters such as transmission duration and a subcarrier spacing in a numerology, and further determines a first uplink grant resource by using the method provided in this application. A specific method for determining, by the terminal device, the resource that matches the logical channel may be the same as the method used in prior approaches. For brevity, details are not described herein.

Figure 6:
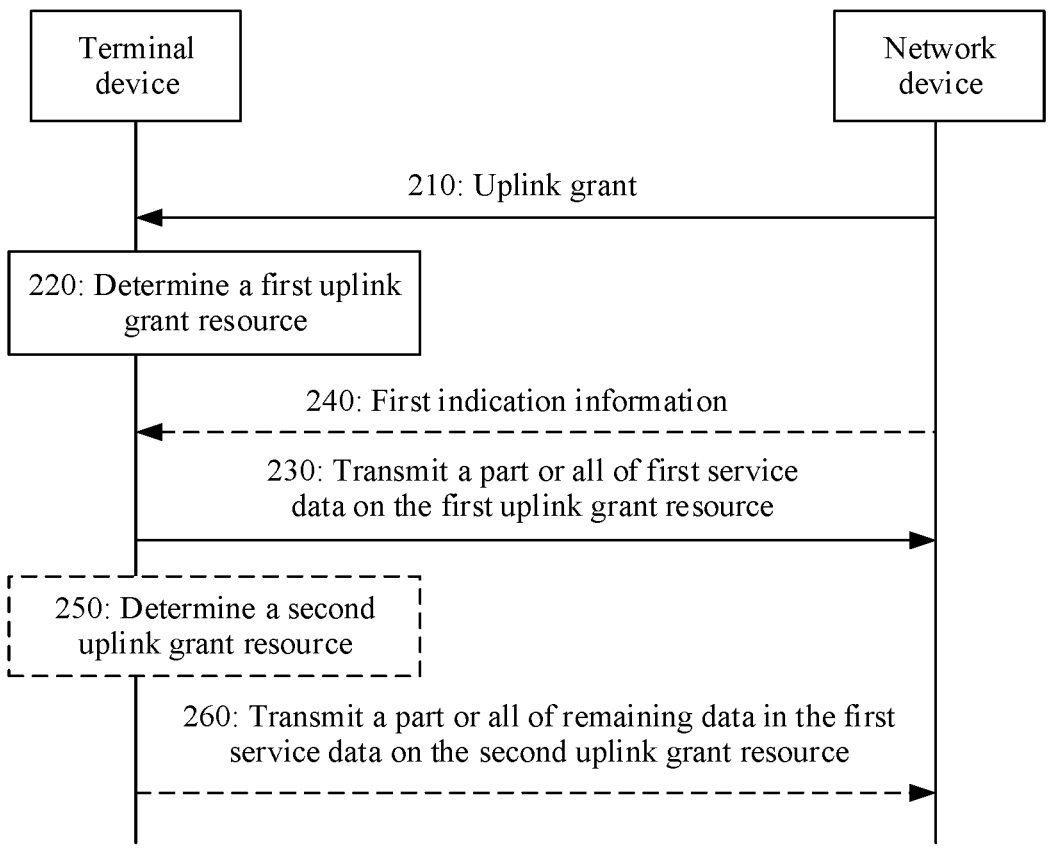
FIG. 6 is a schematic flowchart of a communication method according to an embodiment of this application.

FIG. 6 is a schematic flowchart of a communication method 200 from a device interaction perspective according to an embodiment of this application. As shown in the figure, the method 200 shown in FIG. 6 may include step 210 to step 260. The following describes the communication method in detail with reference to FIG. 6.

Step 210: A terminal device receives an uplink grant.

Specifically, the uplink grant may be understood as signaling sent by a network device to the terminal device, and the signaling may be used to indicate a resource scheduled by the network device for the terminal device. For example, the uplink grant may indicate a resource position of an uplink grant resource, for example, a time-domain position and a frequency-domain position of the uplink grant resource. The uplink grant may further indicate a size of the uplink grant resource. The uplink grant may further indicate a modulation and coding scheme (MC S) that matches the uplink grant resource. In other words, when the uplink grant resource is used to send data, the MCS that matches the uplink grant resource is to be used to perform coding and modulation processing on the data.

In a possible design, the uplink grant may be carried in downlink control information.

As described above, the downlink control information may be sent by the network device based on a scheduling request of the terminal device. Resource allocation in the downlink control information may indicate the resource position of the uplink grant resource, and an MCS field in the downlink control information may indicate the MCS that matches the uplink grant resource.

The downlink control information may be DCI (DCI) in an LTE or NR protocol, or may be other signaling that is transmitted on a physical downlink control channel and that can be used to carry downlink control information.

It should be understood that the physical downlink control channel herein may be a PDCCH (physical downlink control channel) or an enhanced physical downlink control channel (enhanced PDCCH, EPDCCH) that is defined in the LTE or NR protocol, or another downlink channel that is defined with network evolution and that has the foregoing function.

In this design, the uplink grant resource may be dynamically scheduled.

In another possible design, the uplink grant may be carried in RRC signaling. The RRC signaling may indicate the uplink grant resource pre-configured for the terminal device for use. A preconfigured grant configuration (ConfiguredGrantConfig) information element (IE) in the RRC signaling may carry a start position, a resource size, and a periodicity of the uplink grant resource, so that the terminal device determines the time-domain position and the frequency-domain position of the uplink grant resource. The RRC signaling may further indicate the MCS that matches the uplink grant resource. This configuration manner may be referred to as a configured grant type 1. In this configuration manner, the uplink grant may be the RRC signaling.

In another possible design, the uplink grant may be downlink control information. The network device may first indicate, via RRC signaling, information such as a periodicity of the uplink grant resource preconfigured for the terminal for use. When receiving the downlink control information, the terminal device may activates and starts to use the preconfigured uplink grant resource based on information, such as a start position, a resource size of the uplink grant resource, and the MCS that matches the uplink grant, carried in the downlink control information. This configuration manner may be referred to as a configured grant type 2. In this configuration manner, the uplink grant may be the downlink control information.

In this design, the uplink grant resource may be preconfigured, for example, may be a semi-persistent scheduling (SPS) resource or a grant free resource.

It should be understood that the foregoing enumerated signaling used to carry the uplink grant and the foregoing enumerated manner of using the signaling to indicate the uplink grant resource are merely examples for description, and should not constitute any limitation on this application. This application does not exclude a possibility of using other signaling to carry the uplink grant, or a possibility of using another manner or another field to indicate the uplink grant resource.

In an embodiment of this application, the terminal device may receive one or more uplink grants, and each uplink grant may be used to indicate one uplink grant resource. In other words, the network device may schedule one or more uplink grant resources for the terminal device. If the terminal device receives a plurality of uplink grants, a plurality of uplink grant resources corresponding to the plurality of uplink grants do not overlap. In other words, the plurality of uplink grant resources are located at different time-domain positions.

Step 220: The terminal device determines, based on the time-domain position of the uplink grant resource indicated by the uplink grant, a first uplink grant resource used to transmit first service data.

Specifically, the first service data may be data transmitted through the foregoing deterministic network, for example, data of a URLLC service. In this embodiment of this application, for ease of differentiation and description, the resource that is determined by the terminal device and that is used to transmit the first service data is denoted as a first uplink transmission resource.

Optionally, the first service data meets one or more of the following:

A: A prioritized bit rate of the first service data is infinite.

B: A value of a priority of the first service data is less than or equal to a preset threshold.

C: The first service data is high-priority data.

In other words, when data carried on a logical channel meets any one of A to C, it may be considered that the data carried on the logical channel is the first service data.

In this embodiment of this application, to differentiate from common service data, for example, delay-insensitive service data, the first service data may be differentiated via an indication field in a logical channel configuration information element of the logical channel carrying the first service data.

In a possible design, a priority field for the first service data is carried in the logical channel configuration information element, and the priority field may indicate the value of the priority of the first service data.

For example, the value of the priority may be used to determine whether the priority is high or low. For example, a larger value indicates a lower priority, and a smaller value indicates a higher priority. The terminal device and the network device may pre-negotiate or preconfigure the priority threshold. When the value of the priority indicated in the priority field is less than or equal to the threshold, it is considered that the data carried on the logical channel is the first service data.

The threshold may be predefined, for example, defined in the protocol. A value of the threshold is not limited in this application.

In another possible design, a high priority field for the first service data is carried in the logical channel configuration information element (LCH IE), and the priority field may indicate that the first service data is high-priority data.

The high priority field may be understood as a switch used to indicate whether the priority of the data carried on the logical channel is high. For example, if the high priority field is set to "0", it indicates that the data carried on the logical channel is low-priority data; or if the high priority field is set to 1, it indicates that the data carried on the logical channel is high-priority data. Alternatively, if the high priority field is set to "FALSE", it indicates that the data carried on the logical channel is low-priority data; or if the high priority field is set to "TRUE", it indicates that the data carried on the logical channel is high-priority data. The high priority field may be different from the priority field described above.

It should be understood that the foregoing enumerated correspondences between the value of the priority field and the high/low priority and the foregoing enumerated correspondences between the value of the high priority field and the high/low priority are merely examples for description, and should not constitute any limitation on this application. For example, it may also be agreed on that a larger value indicates a higher priority, or it may be agreed on that the high priority field being set to "0" or "FALSE" corresponds to high-priority data.

In still another possible design, a prioritized bit rate field of the first service data is set to infinity.

For example, PBR=infinity is indicated in the prioritized bit rate field in the logical channel configuration information element.

The foregoing enumerates a plurality of different manners to indicate the first service data. When reading any one of the foregoing enumerated fields, a MAC entity may determine that the data carried on the logical channel is the first service data, perform preferential processing on the data, and determine the first uplink grant resource for the data.

The preferential processing herein may be as follows: The MAC entity preferentially performs LCP processing on the logical channel carrying the first service data, selects an appropriate physical uplink resource (for example, the first uplink grant resource) for the first service data, and performs packet assembly based on the resource, for example, performs packet assembly on the first service data based on an MCS corresponding to the first uplink grant resource. In addition, when performing packet assembly on the first service data, the MAC entity may temporarily ignore the common service data, and perform LCP processing on the common service data after preferential sending of all of the first service data is completed. For a specific LCP process, refer to the foregoing descriptions. For brevity, details are not described herein again.

In an embodiment of this application, to reduce a transmission delay of the first service data, the terminal device may determine, in any one of the following manners based on time-domain start positions of a plurality of uplink grant resources indicated by a plurality of uplink grants, the first uplink grant resource used to transmit the first service data:

Manner 1: The terminal device determines first remaining time of the uplink grant resources based on the time-domain start positions of the uplink grant resources indicated by the uplink grants, and determines, from the uplink grant resources, a resource with first remaining time greater than or equal to a delay threshold that is preconfigured, as the first uplink grant resource. The first remaining time is a time interval between a time-domain end position of the uplink grant resource and a timeout moment before the first service data is correctly received.

Manner 2: The terminal device determines, from the plurality of uplink grant resources based on the time-domain start positions of the uplink grant resources indicated by the uplink grants, a resource at a foremost time-domain position as the first uplink grant resource.

Manner 3: The terminal device determines first remaining time of the uplink grant resources based on time-domain end positions of the uplink grant resources indicated by the uplink grants, and determines, from the uplink grant resources, a resource that can be used to transmit a quantity of bits greater than or equal to a size of the first service data and whose first remaining time is greater than or equal to a delay threshold that is preconfigured, as the first uplink grant resource.

Manner 4: The terminal device determines first remaining time of the uplink grant resources based on time-domain end positions of the uplink grant resources indicated by the uplink grants, and determines, from the uplink grant resources, a resource that is located at a foremost time-domain position and whose first remaining time is greater than or equal to a delay threshold that is preconfigured, as the first uplink grant resource.

The four manners are described in detail below with reference to the accompanying drawings. For brevity, details of the four manners are not described herein.

Step 230: The terminal device sends the first service data on the first uplink grant resource.

Specifically, a quantity of bits that can be transmitted on the first uplink grant resource may be greater than or equal to the size of the first service data, or may be less than the size of the first service data. If the quantity of bits that can be transmitted on the first uplink grant resource is greater than or equal to the size of the first service data, step 230 may include the following: The terminal device may send all of the first service data on the first uplink grant resource. If the quantity of bits that can be transmitted on the first uplink grant resource is less than the size of the first service data, step 230 may include the following: The terminal device may send a part of the first service data on the first uplink grant resource. For ease of differentiation and description, a part of the first service data sent on the first uplink grant resource is denoted as first partial data. In other words, the terminal device may send all of the first service data or the first partial data in the first service data on the first uplink grant resource.

Further, optionally, before step 230, the method 200 further includes: receiving, by the terminal device, first indication information, where the first indication information indicates whether segmented transmission of the first service data is supported.

Correspondingly, in step 240: The network device sends the first indication information, where the first indication information indicates whether segmented transmission of the first service data is supported.

In a possible design, the first indication information may be indicated in a segmentation field in the logical channel configuration information element. For example, if the field is "TRUE", it indicates that segmented transmission is not supported; or if the field is "FALSE", it indicates that segmented transmission is supported.

If the quantity of bits that can be transmitted on the first uplink grant resource is greater than or equal to the size of the first service data, regardless of whether segmented transmission of the first service data is supported, the terminal device may send all of the first service data on the first uplink grant resource. If the quantity of bits that can be transmitted on the first uplink grant resource is less than the size of the first service data, and segmented transmission of the first service data is not supported, the terminal device may temporarily skip sending the first service data, but wait for an uplink grant resource to be scheduled next time. If the quantity of bits that can be transmitted on the first uplink grant resource is less than the size of the first service data, and segmented transmission of the first service data is supported, the terminal device may transmit the first partial data in the first service data on the first uplink grant resource.

In this case, if the network device schedules the plurality of uplink grant resources for the terminal device, the method 200 optionally includes the following steps:

Step 250: The terminal device determines a second uplink grant resource.

Step 260: The terminal device transmits a part or all of remaining data in the first service data on the second uplink grant resource.

In step 250, the terminal device may determine the second uplink grant resource from resources in the plurality of uplink grant resources other than the first uplink grant resource. Optionally, the second uplink grant resource may be a resource at a foremost time-domain position in the plurality of uplink grant resources other than the first uplink grant resource. Optionally, the second uplink grant resource may be a resource indicated by an uplink grant that arrives first in the plurality of uplink grant resources other than the first uplink grant resource.

A specific embodiment of a method for determining a resource at a foremost time-domain position from the plurality of uplink grant resources is described in detail below with reference to Manner 2. Details of the specific method are not described herein.

Remaining data of the first service data is data in the first service data other than the first partial data. For ease of differentiation and description, the remaining data may be denoted as second partial data. A quantity of bits that can be transmitted on the second uplink grant resource may be greater than or equal to a size of the second partial data in the first service data, or may be less than a size of the second partial data in the first service data. In this case, in step 260, the terminal device may transmit a part or all of the second partial data in the first service data on the second uplink grant resource. It may be understood that the first partial data and the second partial data may constitute all of the first service data, or may constitute a part of the first service data.

Based on the foregoing technical solution, the terminal device can select, based on the time-domain position of the uplink grant resource, the appropriate first uplink grant resource to send the first service data. This is different from prior approaches, and the terminal device does not depend on an arrival moment of uplink scheduling to determine a resource used to transmit the first service data; instead, a time-domain position of the resource is considered, in other words, a moment for sending the first service data is considered. In this way, the appropriate resource can be allocated for transmitting the delay-sensitive first service data, and a transmission delay can be reduced. In addition, the technical solution is not only applicable to a dynamically scheduled uplink grant resource, but also applicable to a preconfigured uplink grant resource.

The following describes step 220 in the method 200 in detail with reference to FIG. 7 to FIG. 11.

Figure 7:
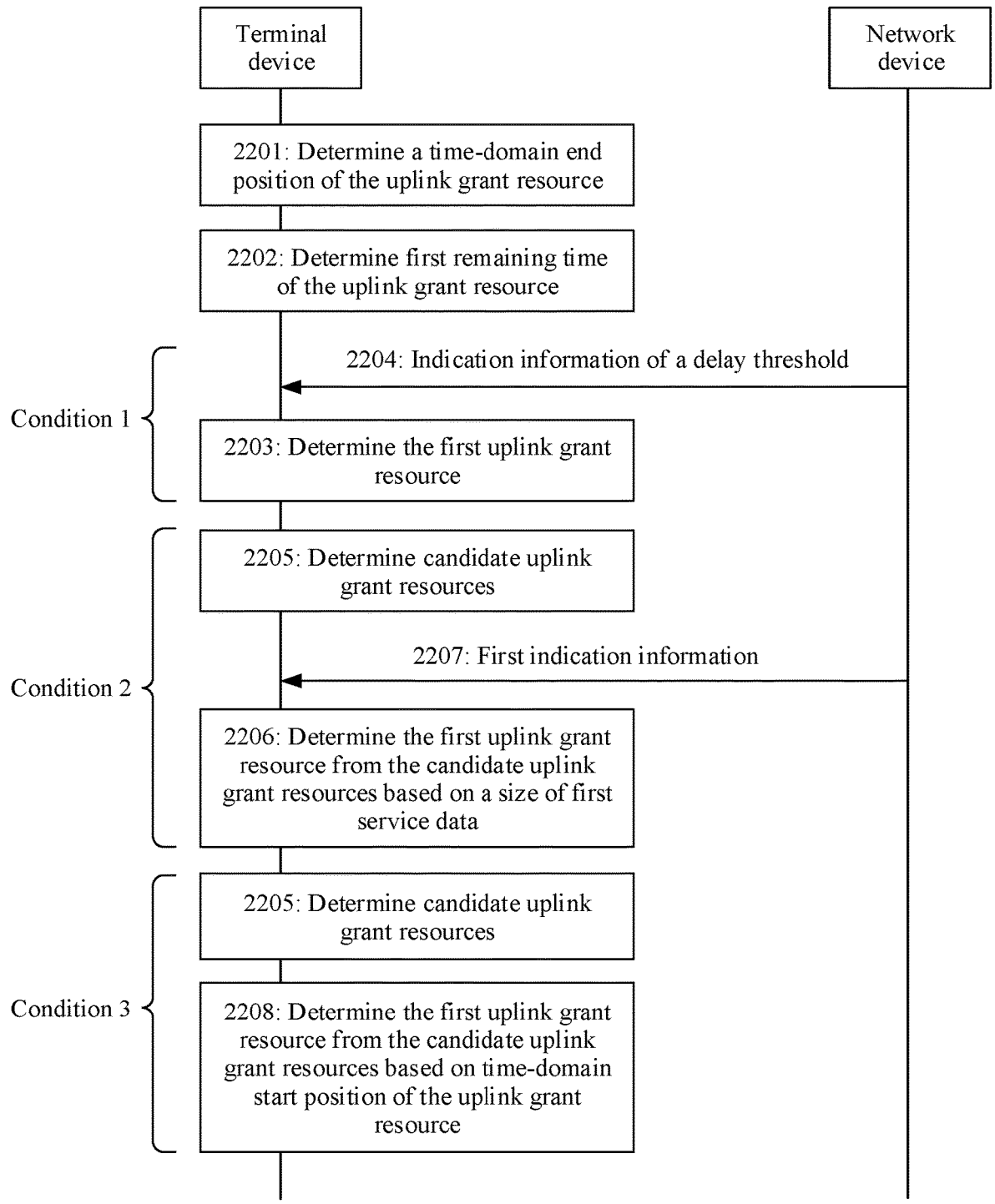
FIG. 7 is another schematic flowchart of the communication method according to an embodiment of this application.

FIG. 7 is another schematic flowchart of the communication method according to an embodiment of this application. FIG. 7 specifically shows Manner 1, Manner 3, and Manner 4 in step 220 in the foregoing method procedure.

As shown in the figure, step 220 may further include step 2201 to step 2208. The following provides detailed descriptions with reference to FIG. 7.

Step 2201: The terminal device determines a time-domain end position of the uplink grant resource.

In an embodiment of this application, the network device may send one or more uplink grants to the terminal device. In other words, the terminal device may determine the first uplink grant resource from one or more uplink grant resources. As described above, the uplink grant resource may be dynamically scheduled, or may be preconfigured.

If the uplink grant resource is dynamically scheduled, the terminal device may receive the one or more uplink grants sent by the network device, and each uplink grant may indicate a time-domain position and a resource size of one uplink grant resource. In a possible embodiment, each uplink grant may indicate a parameter K2, a position S of a start symbol, and a resource length L. The parameter K2 may indicate a slot offset from a slot in which a time-domain start position of an uplink grant resource is located to a slot in which the uplink grant is received. The position S of a start symbol may indicate a position of a start symbol of the uplink grant resource in the slot in which the uplink grant resource is located, namely, a quantity of symbols that is offset relative to the first symbol of a start slot of the uplink grant resource. The resource length L may indicate a quantity of symbols occupied by the uplink grant resource. Herein, the start slot of the uplink grant resource may be understood as the slot in which the time-domain start position of the uplink grant resource is located. In this case, the terminal device may determine a time-domain end position of each uplink grant resource based on a moment at which each uplink grant is received and a parameter K2, a position S of a start symbol, and a resource length L that are indicated by the uplink grant. For example, the end position $t_2 = N \times K2 + S + L$, where N represents a quantity of symbols included in one slot. In another possible embodiment, the terminal device may directly determine an end position of an uplink grant resource based on a parameter K2 indicated by an uplink grant. For example, $t_2 = K2$.

If the uplink grant resource is preconfigured, the end position of the uplink grant resource may be determined based on a start position $t_b$, a resource length L, and a periodicity P corresponding to a group of uplink grant resources to which the uplink grant resource belongs. For example, the end position $t_2 = t_b + n \times P + L$, where n may represent a quantity of periodicities, a value of n may be determined by the terminal device, and P may represent a quantity of symbols included in one periodicity corresponding to the uplink grant resources.

Specifically, if the uplink grant resource is configured based on the configured uplink grant type 1, the uplink grant may be RRC signaling, and information such as the start position $t_b$, the resource length L, and the periodicity P corresponding to the group of uplink grant resources to which the uplink grant resource belongs may be indicated in the RRC signaling. If the uplink grant resource is configured based on the configured uplink grant type 2, the uplink grant may be downlink control information, and the start position corresponding to the group of uplink grant resources to which the uplink grant resource belongs may be further determined based on K2 and a position S of a start symbol that are in the downlink control information. For example, $t_b = N \times K2 + S$.

It should be noted that the moment at which the uplink grant is received is a moment at which the uplink grant arrives and may be understood as a time-domain position of downlink control information carrying the uplink grant, or a time-domain position of a physical downlink control channel carrying the downlink control information. The moment may be notified by the network device to the terminal device via other downlink control signaling, or may be preconfigured. The terminal device may perform monitoring at a particular position.

If the uplink grant resource is configured based on the configured uplink grant type 1, the network device may send the RRC signaling to the terminal device. In a possible embodiment, the RRC signaling may indicate a start position, a size, and a periodicity of one or more groups of uplink grant resources scheduled for the terminal device. To be specific, a plurality of uplink grant resources are periodically arranged in time domain, and the terminal device may determine, based on a time-domain start position and a size corresponding to this group of the uplink grant resources, a time-domain end position of a next uplink grant resource in this same group of the uplink grant resources, or determine a time-domain end position of a closest uplink grant resource in the same group of the uplink grant resources.

It should be understood that the foregoing enumerated specific method for determining a time-domain end position of an uplink grant resource is merely used as an example for description, and should not constitute any limitation on this application. The specific method for determining, by the terminal device, a time-domain end position of an uplink grant resource is not limited in this application. For example, the network device may directly indicate a time-domain end position of a scheduled physical uplink resource.

Step 2202: The terminal device determines first remaining time of the uplink grant resource.

The first remaining time is a time interval between a time-domain end position of the uplink grant resource and a timeout moment for the first service data. In other words, the first remaining time is a time interval between a time-domain end position of the uplink grant resource and a timeout moment specified by a timer. The timer may be started by an entity at any protocol layer such as a PDCP entity or an SDAP entity when the entity receives the first service data. Duration specified by the timer may be used to determine a latest moment at which the first service data is received. In a possible embodiment, if the terminal device receives an acknowledgment (ACK) message for the first service data within duration specified by the timer, it indicates that the first service data is correctly received.

When the uplink grant resource is dynamically scheduled, if the network device schedules a plurality of uplink grant resources for the terminal device, the plurality of uplink grant resources may correspond to a plurality of first remaining time. When the uplink grant resource is preconfigured, if the network device schedules a plurality of groups of uplink grant resources with different periodicities for the terminal device, closest uplink grant resources in the plurality of groups of uplink grant resources may have different first remaining time.

Step 2203: The terminal device determines, based on the first remaining time of the uplink grant resource, the first uplink grant resource used to transmit the first service data.

The terminal device may determine, based on a delay threshold that is preconfigured and the first remaining time of the uplink grant resource, the first uplink grant resource from the one or more uplink grant resources scheduled by the network device. Specifically, the terminal device may select, from the one or more uplink grant resources scheduled by the network device, an uplink grant resource with first remaining time greater than or equal to the delay threshold. For ease of differentiation and description, the condition that first remaining time is greater than or equal to the delay threshold may be denoted as Condition 1.

If there is only one uplink grant resource with first remaining time greater than or equal to the delay threshold, the terminal device may determine the uplink grant resource as the first uplink grant resource. If there are a plurality of uplink grant resources with first remaining time greater than or equal to the delay threshold, the terminal device may autonomously select one of the uplink grant resources as the first uplink grant resource. For example, the terminal device selects a resource with a largest size as the first uplink grant resource, or selects a resource at a foremost time-domain position as the first uplink grant resource. If there is no uplink grant resource with first remaining time greater than or equal to the delay threshold, the terminal device may temporarily skip performing packet assembly on the first service data, but wait for a resource to be scheduled next time, and check whether an uplink grant resource with first remaining time greater than or equal to the delay threshold can be found to transmit the first service data.

The delay threshold may be understood as an allowed time period used for air interface processing, or referred to as an allowed delay. In other words, the delay threshold may be understood as an allowed minimum time interval from a moment at which data is sent to a moment at which the data is correctly received. In this time period, the data can be demodulated, decoded, or retransmitted until the data is correctly obtained. Therefore, provided that first remaining time of an uplink grant resource is greater than or equal to the delay threshold, a transmission delay caused by the uplink grant resource can meet a delay requirement of the service.

In this embodiment of this application, the delay threshold may be predefined, for example, defined in a protocol, or may be indicated by the network device to the terminal device in advance. Optionally, the method further includes step 2204: The terminal device receives indication information of the delay threshold.

Correspondingly, in step 2204, the network device sends the indication information of the delay threshold, where the indication information is used to indicate a value of the delay threshold. For example, the indication information may be information about a specific value of the delay threshold, or may be an indication information element corresponding to a value of the delay threshold.

Optionally, the delay threshold may be configured by an access network device. For example, the indication information of the delay threshold may be carried in RRC signaling. For example, a delay threshold field is added to a logical channel configuration information element of the RRC signaling, or a delay threshold field is added to a MAC configuration of the RRC signaling, or a delay threshold field is added to an RLC configuration or an RLC bearer configuration of the RRC signaling.

Optionally, the delay threshold may be configured by a core network device. The indication information of the delay threshold may be transferred to the access network device through a next generation (NG) interface, and the access network device may indicate the indication information to the terminal device via, for example, the RRC signaling.

It should be understood that the steps shown in the figure are merely used as an example, and should not constitute any limitation on a sequence of performing the steps. For example, step 2204 is not necessarily performed after step 2203, and step 2204 may be performed before step 2203, or may be performed before step 2201. This is not limited in this application.

Based on step 2201 to step 2204, the terminal device may determine the first uplink grant resource used to transmit the first service data. In this case, the first uplink grant resource is determined in Manner 1 described above.

Figure 8:
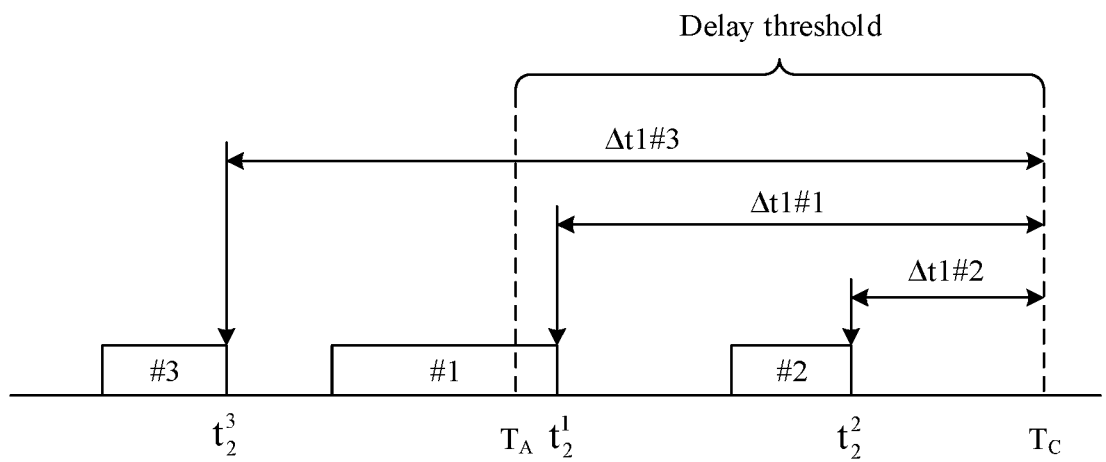
FIG. 8 is a schematic diagram of determining, by a terminal device, a first uplink grant resource based on first remaining time of an uplink grant resource.
Figure 9:
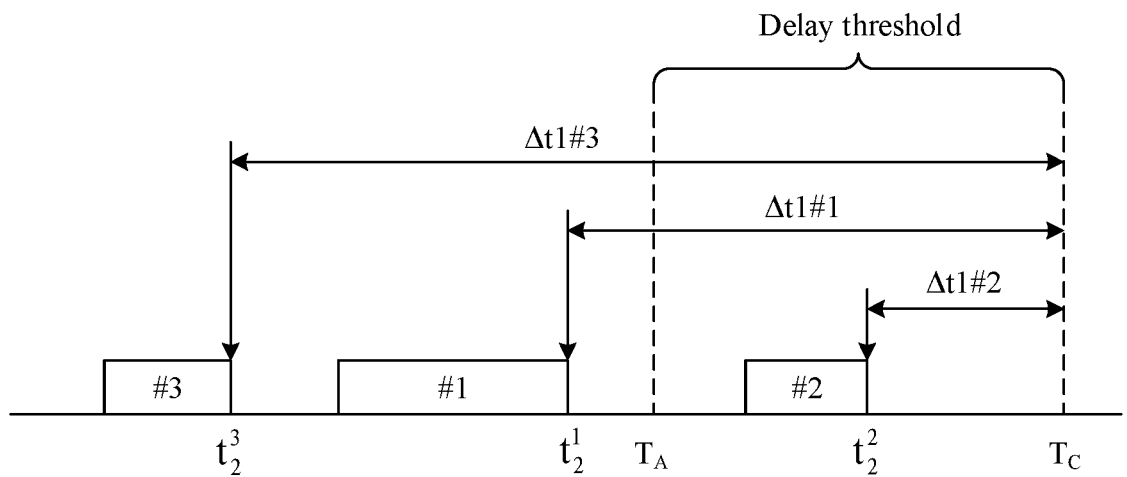
FIG. 9 is another schematic diagram of determining, by a terminal device, a first uplink grant resource based on first remaining time of an uplink grant resource.

For ease of understanding, the following describes, with reference to FIG. 8 and FIG. 9, a process in which the terminal device determines the first uplink grant resource based on first remaining time of an uplink grant resource. FIG. 8 is a schematic diagram of determining, by a terminal device, a first uplink grant resource based on first remaining time of an uplink grant resource. As shown in FIG. 8, it is assumed that the network device schedules three uplink grant resources for the terminal device, which are a resource #1, a resource #2, and a resource #3 shown in the figure. Time-domain end positions of the resource #1, the resource #2, and the resource #3 may respectively correspond to $t_2^2$, $t_2^2$, and $t_2^3$. In the figure, the $T_C$ may represent a timeout moment that is determined based on duration of a timer and before which the first service data is correctly received, and $T_C - T_A$ may represent a delay threshold $T_0$, that is, $T_0 = T_C - T_A$. In other words, $T_A$ may be understood as a latest transmission end moment of the first service data, where the latest transmission end moment meets the delay requirement for the first service data, and the delay requirement can be met only when a transmission end moment of the first service data is earlier than $T_A$. A value of $T_A$ may be determined based on the timeout moment and the delay threshold.

As shown in the figure, first remaining time (for example, which is denoted as Δt1) of the resource #1, the resource #2, and the resource #3 may be respectively represented as: Δt1 #1=$T_C - t_2^1$, Δt1 #2=$T_C - t_2^2$, and Δt1 #3=$T_C - t_2$. If the terminal device determines the first uplink grant resource in Manner 1 described above, the resource #3 in the figure may meet Condition 1, that is, Δt1 #3>$T_0$, where To represents the delay threshold. In this case, the terminal device may determine the resource #3 as the first uplink grant resource.

FIG. 9 is another schematic diagram of determining, by a terminal device, a first uplink grant resource based on first remaining time of an uplink grant resource. As shown in FIG. 9, there are a resource #1, a resource #2, and a resource #3. Time-domain end positions of the resource #1, the resource #2, and the resource #3 may respectively correspond to $t_2^1$, $t_2^2$, and $t_2^3$. In the figure, the $T_C$ may represent a timeout moment that is determined based on duration of a timer and before which the first service data is correctly received, and $T_C - T_A$ may represent a delay threshold $T_0$, that is, $T_0 = T_C - T_A$. In other words, $T_A$ may be understood as a latest transmission end moment of the first service data, where the latest transmission end moment meets the delay requirement for the first service data, and the delay requirement can be met only when a transmission end moment of the first service data is earlier than $T_A$. As shown in the figure, first remaining time (for example, which is denoted as Δt1) of the resource #1, the resource #2, and the resource #3 may be respectively represented as: Δt1 #1=$T_C - t_2^1$, Δt1 #2=$T_C - t^2$, and Δt1 #3=$T_C - t_2^3$. If the terminal device determines the first uplink grant resource in Manner 1 described above, both the resource #3 and the resource #1 in the figure may meet Condition 1, that is, Δt1 #1>$T_0$, and Δt1 #3>$T_0$, where $T_0$ (that is, $T_C - T_A$) represents the delay threshold. In this case, the terminal device may determine the resource #3 or the resource #1 as the first uplink grant resource.

It should be noted that, for ease of understanding, the figure shows only a position of $T_A$. In an embodiment process, the terminal device may not determine the position of $T_A$, but directly determine, based on the first remaining time of each uplink grant resource and a difference between the timeout moment $T_C$ and the delay threshold, the first uplink grant resource that meets Condition 1.

It should be further noted that when the terminal device determines the first uplink grant resource based on Condition 1, it is expected that the transmission delay of the first service data can meet the delay requirement of the service, in other words, a receive end (for example, the network device) can correctly receive the first service data before the timeout moment. If a quantity of bits that can be transmitted on the first uplink grant resource (for example, the resource #3 in FIG. 9) determined by the terminal device in step 2203 is less than a size of the first service data, the terminal device may transmit the first service data in segments, and the terminal device further needs to determine a second uplink grant resource that meets Condition 1. In other words, to meet the delay requirement of the service, one or more uplink grant resources selected by the terminal device to transmit the first service data need to meet Condition 1. As shown in FIG. 9, the terminal device may determine the resource #3 as the first uplink grant resource, and determine the resource #1 as the second uplink grant resource.

However, it should be understood that a specific manner of determining the first uplink grant resource by the terminal device is not limited to Manner 1. When the terminal device determines, in step 2203, that there are a plurality of uplink grant resources with first remaining time greater than or equal to the preset threshold (for example, as shown in FIG. 9), the terminal device may not perform step 2203, but directly perform step 2205: The terminal device determines, based on the first remaining time of the uplink grant resources, candidate uplink grant resources used to transmit the first service data, where the candidate uplink grant resources may include a plurality of uplink grant resources that meet Condition 1, and the terminal device may further determine the first uplink grant resource based on one or two of the following conditions:

Condition 2: A quantity of bits that can be transmitted on the first uplink grant resource is greater than or equal to the size of first service data.

Condition 3: The first uplink grant resource is a resource at a foremost time-domain position in the plurality of uplink grant resources.

Specifically, the first uplink grant resource that meets Condition 1 and Condition 2 may be determined in Manner 3 described above, and the first uplink grant resource that meets Condition 1 and Condition 3 may be determined in Manner 4 described above. The following provides detailed descriptions with reference to Condition 2 and Condition 3. It should be noted that in the following example, it is assumed that the terminal device determines, in step 2203, that there are a plurality of uplink grant resources that meet Condition 1.

Condition 2:

Optionally, the method further includes step 2206: The terminal device determines the first uplink grant resource from the candidate uplink grant resources, where a quantity of bits that can be transmitted on the first uplink grant resource is greater than or equal to the size of the first service data.

A person skilled in the art may understand that, when it is assumed that the first service data is to be transmitted in segments, the first service data needs to be transmitted on two or more uplink grant resources (for example, the first uplink grant resource and the second uplink grant resource may be included). In this case, the first service data can be obtained only after data carried on the first uplink grant resource and data carried on the second uplink grant resource are both decoded and demodulated. However, if data carried on either of the two uplink grant resources is not successfully decoded or demodulated, the first service data cannot be obtained. In this case, retransmission is to be performed to resolve the problem. Consequently, a particular transmission delay may be caused.

Therefore, when there are the plurality of uplink grant resources that meet Condition 1, regardless of whether segmented transmission of the first service data is supported, the terminal device may directly select, from the candidate uplink grant resources that meet Condition 1, a resource that meets Condition 2 as the first uplink grant resource.

The terminal device may also determine, based on a characteristic of whether segmented transmission of the first service data is supported, whether the first uplink grant resource needs to meet Condition 2.

Still as shown in FIG. 9, both the resource #1 and the resource #3 may be understood as the candidate uplink grant resources in step 2205. The terminal device may further determine the first uplink grant resource with reference to Condition 2. It is assumed that the resource #1 is relatively large and can be used to transmit a quantity of bits greater than or equal to the size of the first service data, and the resource #3 is relatively small and can be used to transmit a quantity of bits less than the size of the first service data. In this case, the terminal device may further determine the resource #1 as the first uplink grant resource.

In this embodiment of this application, supporting segmentation or not supporting segmentation may be configured for the first service data. Optionally, the method further includes step 2207: The terminal device receives first indication information, where the first indication information indicates whether segmented transmission of the first service data is supported.

Correspondingly, in step 2207, the network device sends the first indication information, where the first indication information indicates whether segmented transmission of the first service data is supported.

It should be understood that step 2207 may be the same as step 240 in the method 200, and is shown herein merely for ease of understanding. Step 240 has been described in detail above. For brevity, details are not described herein again.

The terminal device may also determine, based on the indication that is received in step 2207 and that indicates whether segmentation is supported, whether a resource to be used as the first uplink grant resource needs to meet Condition 2.

It should be understood that, when there may be one uplink grant resource that meets Condition 1 and Condition 2, the terminal device may directly determine the uplink grant resource as the first uplink grant resource; and when there may be a plurality of uplink grant resources that meet Condition 1 and Condition 2, the terminal device may determine any one of the plurality of uplink grant resources that meet Condition 1 and Condition 2 as the first uplink grant resource, or the terminal device may further select an uplink grant resource that meets Condition 3 as the first uplink grant resource. This is not limited in this embodiment of this application.

Condition 3:

Optionally, the method further includes step 2208: The terminal device determines the first uplink grant resource from the candidate uplink grant resources, where the first uplink grant resource is a resource at a foremost time-domain position in the candidate uplink grant resources.

When there are a plurality of uplink grant resources that meet Condition 1, the terminal device may select, from the plurality of uplink grant resources that meet Condition 1, a resource at a foremost time-domain position as the first uplink grant resource. This can ensure that the first service data is first sent. The determined first uplink grant resource not only can ensure that the transmission delay of the first service data meets the requirement, but also can minimize the transmission delay of the first service data.

Still as shown in FIG. 9, both the resource #1 and the resource #3 may be understood as the candidate uplink grant resources in step 2205. The terminal device may further determine the first uplink grant resource with reference to Condition 3. It is assumed that a sequence of time-domain positions of the resource #1, the resource #2, and the resource #3 meets $t_1^3 < t_1^1 < t_1^2$. In this case, the terminal device may further determine the resource #3 as the first uplink grant resource.

It should be understood that Condition 2 and Condition 3 may be simultaneously used in combination with Condition 1, or may be separately used in combination with Condition 1. This is not limited in this application. In other words, the first uplink grant resource may meet only Condition 1, or may meet both Condition 1 and Condition 2, or may meet both Condition 1 and Condition 3, or may meet Condition 1, Condition 2, and Condition 3. In this case, a minimum transmission delay may be caused when the determined first uplink grant resource is used to transmit the first service data. For example, there may be a plurality of uplink grant resources that meet Condition 2, and the terminal device may further select, from the uplink grant resources that meet Condition 2, a resource that meets Condition 3 as the first uplink grant resource. In this case, Condition 1, Condition 2, and Condition 3 are combined for use. For another example, there may be one uplink grant resource that meets Condition 2, and the resource may further meet Condition 3. In this case, the determined first uplink grant resource may meet Condition 1, Condition 2, and Condition 3, and a minimum transmission delay may also be caused when the first uplink grant resource is used to transmit the first service data. For still another example, there may be one uplink grant resource that meets Condition 2, but the resource does not meet Condition 3. In this case, Condition 1 and Condition 2 may be combined for use. For still another example, an uplink grant resource that meets Condition 3 may not meet Condition 2, or all uplink grant resources that meet Condition 1 do not meet Condition 2. In this case, Condition 1 and Condition 3 are combined for use.

It should be further understood that which one or more of Condition 1, Condition 2, and Condition 3 is/are used to determine the first uplink grant resource may be agreed on by the terminal device and the network device in advance. The terminal device and the network device may determine the first uplink grant resource based on the same one or more conditions, and transmit the first service data on the first uplink grant resource.

It should be further understood that FIG. 7 is merely a schematic flowchart for ease of understanding, and sequence numbers of the steps in the figure do not mean an execution sequence. In addition, when determining the first uplink grant resource based on a different condition, the terminal device may not necessarily perform all the steps in the figure, or may perform other steps. For example, the terminal device may perform one of step 2203 and step 2205. The steps shown in the figure should not constitute any limitation on this application. In a specific embodiment process, the terminal device may perform corresponding steps based on internal logic between the steps.

Based on the foregoing technical solution, the terminal device may transmit the first service data on an uplink grant resource that meets the delay requirement of the first service data. In addition, the terminal device may further select the first uplink grant resource in a manner such as comparing sizes or time-domain positions of resources, to transmit the first service data. This further reduces the transmission delay.

Figure 10:
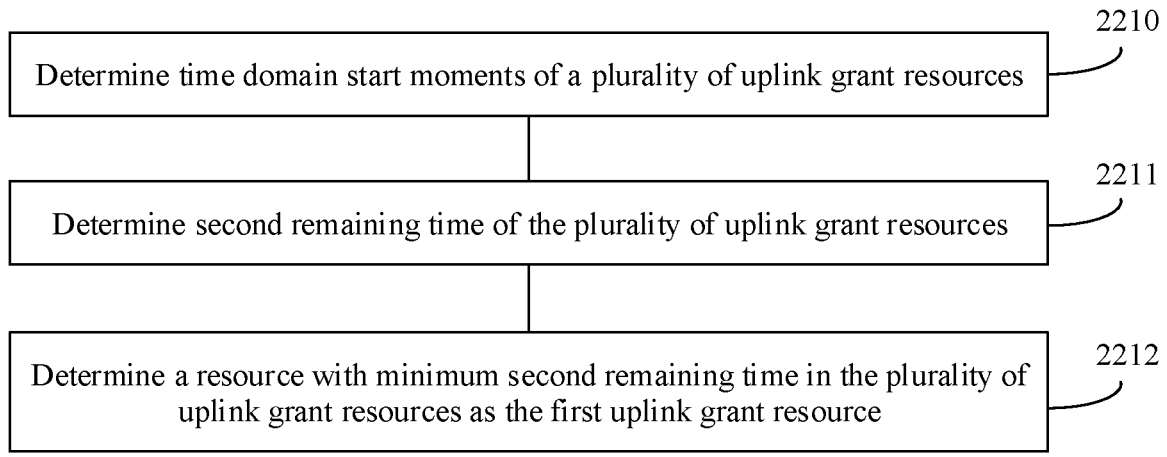
FIG. 10 is still another schematic flowchart of the communication method according to an embodiment of this application.

FIG. 10 is still another schematic flowchart of the communication method according to the embodiment of this application. FIG. 10 specifically shows Manner 2 in step 220 in the foregoing method procedure.

As shown in the figure, step 220 may further include step 2210 to step 2212. The following provides detailed descriptions with reference to FIG. 10.

Step 2210: The terminal device determines a time-domain start position of the uplink grant resource.

If the uplink grant resource is dynamically scheduled, the terminal device may receive one or more uplink grants sent by the network device. Each uplink grant may indicate a time-domain position and a resource size of one uplink grant resource. In a possible embodiment, a start position of an uplink grant resource may be determined based on a parameter K2 and a position S of a start symbol that are indicated in an uplink grant. For example, the start position of the uplink grant resource is $t_1 = N \times K2 + S$, where N indicates a quantity of symbols included in one slot. In another possible embodiment, the terminal device may directly determine a start position of an uplink grant resource based on a parameter K2 indicated by an uplink grant. For example, $t_1 = K2$.

If the uplink grant resource is preconfigured, the start position of the uplink grant resource may be determined based on a start position to and a periodicity P corresponding to a group of uplink grant resources to which the uplink grant resource belongs. For example, the start position of the uplink grant resource is $t_1 = t_0 + n \times P$, where n may represent a quantity of periodicities, a value of n may be determined by the terminal device, and P may represent a quantity of symbols included in one periodicity of the uplink grant resource.

Specifically, if the uplink grant resource is configured based on the configured grant type 1, the uplink grant may be RRC signaling, and the start position to and the periodicity P corresponding to the group of uplink grant resources to which the uplink grant resource belongs may be indicated in the RRC signaling. If the uplink grant is configured based on the configured uplink grant type 2, the uplink grant may be downlink control information, and the start position to corresponding to the group of uplink grant resources to which the uplink grant resource belongs may be further determined based on K2 and a position S in a start symbol that are in the downlink control information. For example, to $=N \times K2 + S$.

In an embodiment of this application, the network device may schedule a plurality of uplink grant resources for the terminal device, and the terminal device may determine the first uplink grant resource based on time-domain start positions of the plurality of uplink grant resources. In a possible embodiment, the terminal device may directly compare the time-domain start positions of the uplink grant resources, and directly determine a resource at a foremost position as the first uplink grant resource. In another possible embodiment, the terminal device may determine the first uplink grant resource based on second remaining time of the uplink grant resources.

Optionally, the method further includes step 2211: The terminal device determines second remaining time of the uplink grant resource.

The second remaining time is a time interval between a time-domain start position of the uplink grant resource and a start moment for performing LCP on the first service data. The moment for performing LCP on a logical channel on which the first service data is located may be indicated by the network device or predefined. This is not limited in this application.

Optionally, the method further includes step 2212: The terminal device determines the first uplink grant resource based on the second remaining time of the uplink grant resource, where the first uplink grant resource is a resource with minimum second remaining time in the plurality of uplink grant resources.

Because the moment for performing LCP on the first service data is definite, if an uplink grant resource is located at an earlier time-domain position, a time interval between the earlier time-domain position and the start moment for performing LCP is smaller, and the first uplink grant resource determined in this case is the resource at the foremost time-domain position in the plurality of uplink grant resources.

Figure 11:
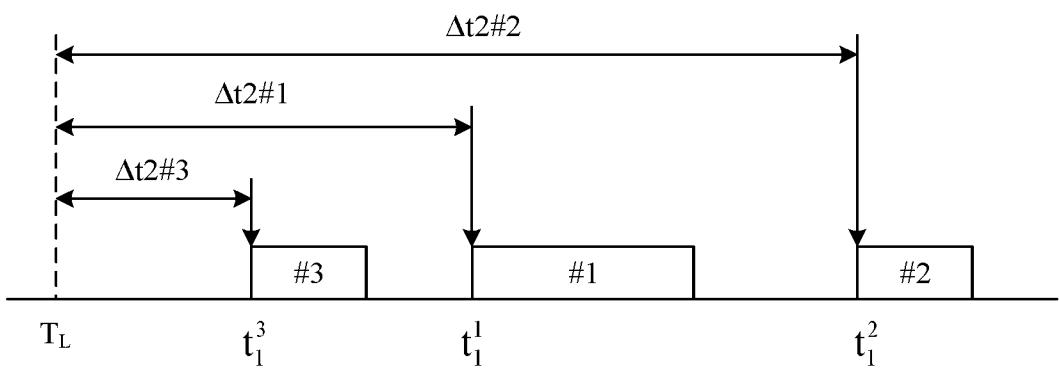
FIG. 11 is a schematic diagram of determining, by a terminal device, a first uplink grant resource based on second remaining time of an uplink grant resource.

For ease of understanding, the following describes, with reference to FIG. 11, a process in which the terminal device determines the first uplink grant resource based on the second remaining time of the uplink grant resource. As shown in FIG. 11, it is assumed that the network device schedules three uplink grant resources for the terminal device, which are a resource #1, a resource #2, and a resource #3 shown in the figure. Time-domain start time of the resource #1, the resource #2, and the resource #3 may respectively correspond to, $t_1^2$, and $t_1^3$. In the figure, $T_L$ may represent a start moment for performing LCP on the first service data, and second remaining time of each resource may be a time interval between time-domain start time of each resource and the start moment for performing LCP.

As shown in the figure, the first remaining time (for example, which is denoted as $\Delta t2$) of the resource #1, the resource #2, and the resource #3 may be respectively represented as $\Delta t2\ \#1 = t_1^2 - T_L$, $\Delta t2\ \#2 = t_1^2 - T_L$, and $\Delta t2\ \#3 = t_1^3 - T_L$, where $\Delta t2\ \#3 < \Delta t2\ \#1 < \Delta t2\ \#2$. If the terminal device determines the first uplink grant resource based on the time-domain start time of each resource, the resource #3 in the figure is a resource with minimum second remaining time, and the terminal device may determine the resource #3 as the first uplink grant resource.

Based on the foregoing technical solution, the terminal device may transmit the first service data on the resource at the foremost time-domain position, in other words, the first service data is first sent. In this way, the transmission delay can be minimized.

Figure 12:
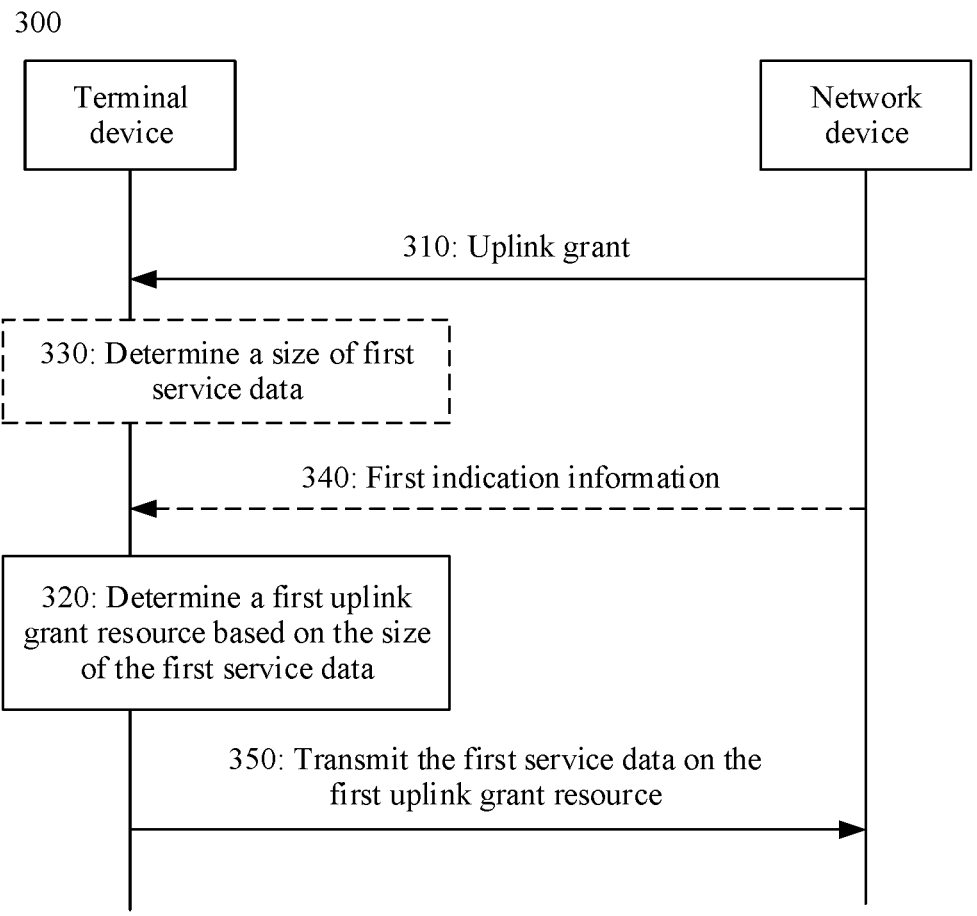
FIG. 12 is a schematic flowchart of a communication method according to another embodiment of this application.

FIG. 12 is a schematic flowchart of a communication method 300 from a device interaction perspective according to another embodiment of this application. As shown in the figure, the method 300 shown in FIG. 12 may include step 310 to step 350. The following describes the communication method in detail with reference to FIG. 12.

Step 310: A terminal device receives an uplink grant.

It should be understood that a specific process of step 310 is the same as a specific process of step 210 in the method 200. For brevity, details are not described herein again.

Step 320: The terminal device determines a first uplink grant resource from an uplink grant resource indicated by the uplink grant, where a quantity of bits that can be transmitted on the first uplink grant resource is greater than or equal to a size of first service data.

Optionally, before the terminal device determines the first uplink grant resource, the method 300 further includes step 330: The terminal device determines the size of the first service data.

Specifically, the terminal device may determine, based on a PBR field, a priority field, or a high priority field in a logical channel configuration information element, that the first service data is data of an emergency service. A condition that the first service data meets has been described in detail in the method 200. For brevity, details are not described herein again.

After determining the first service data, the terminal device may further determine the size of the first service data. As described above, if the first service data is transmitted in segments, the first service data cannot be correctly obtained because data carried on a resource is not successfully decoded or demodulated. In this case, retransmission is to be performed to resolve the problem. Consequently, a particular transmission delay may be caused. In this case, the terminal device may determine, from the uplink grant resource based on the size of the first service data, a resource that can be used to transmit a quantity of bits greater than or equal to the size of the first service data, and determine the resource as the first uplink grant resource.

In this embodiment of this application, supporting segmented transmission or not supporting segmented transmission may be configured for the first service data. Optionally, the method further includes step 340: The terminal device receives first indication information, where the first indication information indicates whether segmented transmission of the first service data is supported.

Correspondingly, in step 340, the network device sends the first indication information, where the first indication information indicates whether segmented transmission of the first service data is supported.

It should be understood that a specific process of step 340 is the same as a specific process of step 240 in the method 200. For brevity, details are not described herein again. Step 350: The terminal device transmits the first service data on the first uplink grant resource.

Because the first uplink grant resource determined by the terminal device in step 320 can be used to transmit the quantity of bits greater than or equal to the size of the first service data, the terminal device may transmit all of the first service data on the first uplink grant resource in step 350.

Further, if the terminal device determines, in step 320, a plurality of resources that can be used to transmit a quantity of bits greater than or equal to the size of the first service data, the terminal device may further determine the first uplink grant resource with reference to Condition 1, Condition 2, or Condition 3 described above. For example, if the terminal device determines the first uplink grant resource with reference to Condition 1, the terminal device may further determine first remaining time of the resources that can be used to transmit the quantity of bits greater than or equal to the size of the first service data, and determine a resource with first remaining time greater than or equal to a delay threshold as the first uplink grant resource. If the terminal device determines the first uplink grant resource with reference to Condition 2, the terminal device may further determine a resource at a foremost time-domain position in the plurality of resources that can be used to transmit the quantity of bits greater than or equal to the size of the first service data as the first uplink grant resource. If there are a plurality of resources that can be used to transmit a quantity of bits greater than or equal to the size of the first service data and that have first remaining time greater than or equal to the delay threshold, the terminal device may further determine, with reference to Condition 3, a resource at a foremost time-domain position in the plurality of resources as the first uplink grant resource. Specific methods for combining the conditions for use have been described in detail above with reference to FIG. 7. For brevity, details are not described herein again.

Based on the foregoing technical solution, the terminal device can use enough resources to send all of the first service data. This avoids a transmission delay that may be caused due to segmented transmission, and helps reduce the transmission delay.

It should be understood that the foregoing describes in detail the communication methods provided in the embodiments of this application with reference to FIG. 6 to FIG. 12. It should be understood that, for only ease of understanding, interaction between the terminal device and the network device is used as an example to describe in detail the methods provided in the embodiments of this application. However, this should not constitute any limitation on this application. The terminal device may also transmit the first service data to another device (for example, another network device or terminal device) after receiving a resource scheduled by the network device. This is not limited in this embodiment of this application.

It should be understood that sequence numbers of the foregoing processes do not mean execution sequences in various embodiments of this application. The execution sequences of the processes should be determined according to functions and internal logic of the processes, and should not constitute any limitation on the embodiment processes of the embodiments of this application.

The foregoing describes in detail the communication methods provided in the embodiments of this application with reference to FIG. 6 to FIG. 12. The following describes in detail a communications apparatus provided in an embodiment of this application with reference to the accompanying drawings.

An embodiment of this application further provides an apparatus configured to implement any one of the foregoing methods. For example, an apparatus is provided, including units (or means) configured to implement the steps performed by the terminal device in any one of the foregoing methods. For another example, another apparatus is further provided, including units (or means) configured to implement the steps performed by the network device in any one of the foregoing methods.

Figure 13:
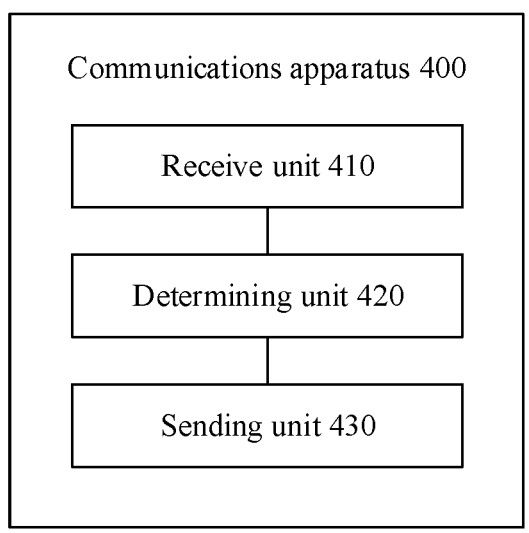
FIG. 13 is a schematic block diagram of a communications apparatus according to an embodiment of this application.

FIG. 13 is a schematic block diagram of a communications apparatus 400 according to an embodiment of this application. As shown in FIG. 13, the communications apparatus 400 may include a receiving unit 410, a determining unit 420, and a sending unit 430.

In a possible design, the communications apparatus 400 may be the terminal device in the method 200 or a chip configured in the terminal device.

Specifically, the receiving unit 410 may be configured to receive an uplink grant.

The determining unit 420 may be configured to determine, based on a time-domain position of an uplink grant resource indicated by the uplink grant, a first uplink grant resource used to transmit first service data.

The sending unit 430 may be configured to transmit the first service data on the uplink grant resource.

Optionally, the determining unit 420 is specifically configured to: determine first remaining time of the uplink grant resource based on the time-domain position of the uplink grant resource indicated by the uplink grant, where the first remaining time is a time interval between a time-domain end position of the uplink grant resource and a timeout moment for the first service data; and determine the first uplink grant resource from the uplink grant resource, where first remaining time of the first uplink grant resource is greater than or equal to a delay threshold that is preconfigured.

Optionally, the receiving unit 410 is further configured to receive indication information of the delay threshold.

Optionally, the first uplink grant resource is a resource at a foremost time-domain position in a plurality of uplink grant resources.

Optionally, the determining unit 420 is specifically configured to: determine second remaining time of the plurality of uplink grant resources based on time-domain positions of the plurality of uplink grant resources indicated by a plurality of uplink grants, where the second remaining time is a time interval between a time-domain start position of the uplink grant resource and a start moment for performing logical channel prioritization (LCP) on a logical channel on which the first service data is located; and determine the first uplink grant resource from the plurality of uplink grant resources, where the first uplink grant resource is a resource with minimum second remaining time in the plurality of uplink grant resources.

Optionally, the determining unit 420 is specifically configured to determine first remaining time of the plurality of uplink grant resources based on time-domain positions of the plurality of uplink grant resources indicated by a plurality of uplink grants, where the first remaining time is a time interval between a time-domain end position of the uplink grant resource and a timeout moment before the first service data is correctly received;

determine a plurality of candidate uplink grant resources from the plurality of uplink grant resources, where first remaining time of the candidate uplink grant resources is greater than or equal to a delay threshold that is preconfigured; and determine the first uplink grant resource from the plurality of candidate uplink grant resources, where the first uplink grant resource is a resource at a foremost time-domain position in the plurality of candidate uplink grant resources.

Optionally, when a quantity of bits that can be transmitted on the first uplink grant resource is greater than or equal to a size of the first service data, the sending unit 430 is specifically configured to transmit all of the first service data on the first uplink grant resource.

Optionally, when a quantity of bits that can be transmitted on the first uplink grant resource is less than a size of the first service data, and segmented transmission of the first service data is supported, the sending unit 430 is specifically configured to transmit a part of the first service data on the first uplink grant resource.

Optionally, the sending unit 430 is further configured to transmit a part or all of remaining data in the first service data on a second uplink grant resource.

The remaining data in the first service data is data not sent on the first uplink grant resource. The second uplink grant resource is a resource with minimum second remaining time in the plurality of uplink grant resources other than the first uplink grant resource, or the second uplink grant resource is a resource corresponding to an uplink grant that first arrives in the plurality of uplink grant resources other than the first uplink grant resource. The second remaining time is a time interval between a time-domain start position of the uplink grant resource and a start moment for performing LCP on the first service data.

Optionally, the receiving unit 410 is further configured to receive first indication information, where the first indication information indicates whether segmented transmission of the first service data is supported.

Optionally, the first service data meets one or more of the following:

a prioritized bit rate (PBR) of the first service data is infinite;

a value of a priority of the first service data is less than or equal to a preset threshold; or the first service data is high-priority data.

Optionally, a priority field for the first service data is carried in a logical channel configuration information element, and the priority field indicates a value of the priority of the first service data.

Optionally, a high priority field for the first service data is carried in the logical channel configuration information element, and the high priority field indicates that the first service data is the high-priority data.

Optionally, a prioritized bit rate (PBR) field for the first service data is carried in the logical channel configuration information element, and the PBR field indicates that the PBR on the first logical channel is infinite.

Optionally, the uplink grant resource is a dynamically scheduled resource, or the uplink grant resource is a semi-persistently scheduled resource.

It should be understood that the communications apparatus 400 may correspond to the terminal device in the communication method 200 in the embodiments of the present invention. The communications apparatus 400 may include units configured to perform the method performed by the terminal device in the communication method 200 in FIG. 6. In addition, the units in the communications apparatus 400 and the foregoing other operations and/or functions are respectively used to implement corresponding procedures of the communication method 200 in FIG. 6. For a specific process of performing a corresponding step by each unit, refer to the descriptions in the method embodiment with reference to FIG. 6 to FIG. 11. For brevity, details are not described herein again.

In another possible design, the communications apparatus 400 may be the terminal device in the method 300 or a chip configured in the terminal device.

Specifically, the receiving unit 410 may be configured to receive an uplink grant.

The determining unit 420 may be configured to determine a first uplink grant resource from an uplink grant resource indicated by the uplink grant, where a quantity of bits that can be transmitted on the first uplink grant resource is greater than or equal to a size of first service data.

The sending unit 430 may be configured to transmit the first service data on the first uplink grant resource.

Optionally, the receiving unit 410 is further configured to receive first indication information, where the first indication information indicates whether segmented transmission of the first service data is supported.

Optionally, the first service data meets one or more of the following:

a prioritized bit rate (PBR) of the first service data is infinite;

a value of a priority of the first service data is less than or equal to a preset threshold; or the first service data is high-priority data.

Optionally, a priority field for the first service data is carried in a logical channel configuration information element, and the priority field indicates a value of the priority of the first service data.

Optionally, a high priority field for the first service data is carried in the logical channel configuration information element, and the high priority field indicates that the first service data is the high-priority data.

Optionally, the uplink grant resource is a dynamically scheduled resource, or the uplink grant resource is a semi-persistently scheduled resource.

It should be understood that the communications apparatus 400 may correspond to the terminal device in the communication method 300 in the embodiments of the present invention. The communications apparatus 400 may include units configured to perform the method performed by the terminal device in the communication method 300 in FIG. 12. In addition, the units in the communications apparatus 400 and the foregoing other operations and/or functions are respectively used to implement corresponding procedures of the communication method 300 in FIG. 12. For a specific process of performing a corresponding step by each unit, refer to the descriptions in the method embodiment with reference to FIG. 12. For brevity, details are not described herein again.

Figure 14:
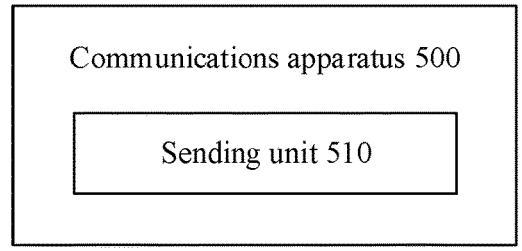
FIG. 14 is a schematic block diagram of a communications apparatus according to another embodiment of this application.

FIG. 14 is a schematic block diagram of a communications apparatus 500 according to an embodiment of this application. As shown in FIG. 14, the communications apparatus 500 may include a sending unit 510.

In a possible design, the communications apparatus 500 may be the network device in the method 200 or a chip configured in the network device.

Specifically, the sending unit 510 may be configured to send an uplink grant, where the uplink grant is used to indicate an uplink grant resource.

Optionally, the sending unit 510 is further configured to send indication information of a delay threshold.

Optionally, the sending unit 510 is further configured to send first indication information, where the first indication information indicates whether segmented transmission of first service data is supported.

Optionally, the first service data meets one or more of the following:

a prioritized bit rate (PBR) of the first service data is infinite;

a value of a priority of the first service data is less than or equal to a preset threshold; or the first service data is high-priority data.

Optionally, a priority field for the first service data is carried in a logical channel configuration information element, and the priority field indicates a value of the priority of the first service data.

Optionally, a high priority field for the first service data is carried in the logical channel configuration information element, and the high priority field indicates that the first service data is the high-priority data.

Optionally, a prioritized bit rate (PBR) field for the first service data is carried in the logical channel configuration information element, and the PBR field indicates that the PBR on the first logical channel is infinite.

Optionally, the uplink grant resource is a dynamically scheduled resource, or the uplink grant resource is a semi-persistently scheduled resource.

It should be understood that the communications apparatus 500 may correspond to the network device in the communication method 200 in the embodiments of the present invention. The communications apparatus 500 may include units configured to perform the method performed by the network device in the communication method 200 in FIG. 6. In addition, the units in the communications apparatus 500 and the foregoing other operations and/or functions are respectively used to implement corresponding procedures of the communication method 200 in FIG. 6. For a specific process of performing a corresponding step by each unit, refer to the descriptions in the method embodiment with reference to FIG. 6 to FIG. 11. For brevity, details are not described herein again.

In another possible design, the communications apparatus 500 may be the network device in the method 300 or a chip configured in the network device.

Specifically, the sending unit 510 may be configured to send an uplink grant.

Optionally, the sending unit 510 is further configured to send first indication information, where the first indication information indicates whether segmented transmission of first service data is supported.

Optionally, the first service data meets one or more of the following:

a prioritized bit rate (PBR) of the first service data is infinite;

a value of a priority of the first service data is less than or equal to a preset threshold; or the first service data is high-priority data.

Optionally, a priority field for the first service data is carried in a logical channel configuration information element, and the priority field indicates a value of the priority of the first service data.

Optionally, a high priority field for the first service data is carried in the logical channel configuration information element, and the high priority field indicates that the first service data is the high-priority data.

Optionally, a prioritized bit rate (PBR) field for the first service data is carried in the logical channel configuration information element, and the PBR field indicates that the PBR on the first logical channel is infinite.

Optionally, the uplink grant resource is a dynamically scheduled resource, or the uplink grant resource is a semi-persistently scheduled resource.

It should be understood that the communications apparatus 500 may correspond to the network device in the communication method 300 in the embodiments of the present invention. The communications apparatus 500 may include units configured to perform the method performed by the network device in the communication method 300 in FIG. 12. In addition, the units in the communications apparatus 500 and the foregoing other operations and/or functions are respectively used to implement corresponding procedures of the communication method 200 in FIG. 12. For a specific process of performing a corresponding step by each unit, refer to the descriptions in the method embodiment with reference to FIG. 12. For brevity, details are not described herein again.

It should be further understood that division into the units in the apparatuses is merely logical function division. In an actual implementation, for example, all or some of the units may be integrated into a physical device, or may be physically separated. In addition, all the units in the apparatuses may be implemented in a form of software invoked by a processing element, or may be implemented in a form of hardware; or some units may be implemented in a form of software invoked by a processing element, and some units may be implemented in a form of hardware. For example, in an implementation, each unit may be a separately disposed processing element, or may be integrated into a chip on the apparatus. Alternatively, each unit may be stored in a memory in a form of a program to be invoked by a processing element of the apparatus to perform a function of the unit. In addition, some or all of the units may be integrated together, or the units may be implemented independently. The processing element herein may also be referred to as a processor, and may be an integrated circuit having a signal processing capability. In an implementation process, the steps of the foregoing methods or the foregoing units may be implemented via an integrated logic circuit in hardware of the processing element, or may be implemented in a form of software invoked by the processing element.

For example, a unit in any one of the foregoing apparatuses may be one or more integrated circuits configured to implement the foregoing methods, for example, one or more application-specific integrated circuits (ASIC), one or more microprocessors (such as a digital signal processor (DSP)), one or more field programmable gate arrays (FPGA), or a combination of at least two of the integrated circuits. For another example, when a unit in the apparatuses is implemented in a form of a program invoked by the processing element, the processing element may be a general-purpose processor, for example, a central processing unit (CPU), or another processor that can invoke the program. For still another example, the units may be integrated and implemented in a form of a system on a chip (SOC).

The foregoing receiving unit is an interface circuit of the apparatus, and is configured to receive a signal from another apparatus. For example, when the apparatus is implemented in a form of a chip, the receiving unit is an interface circuit of the chip, configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit of the chip, configured to send a signal to another chip or apparatus.

Figure 15:
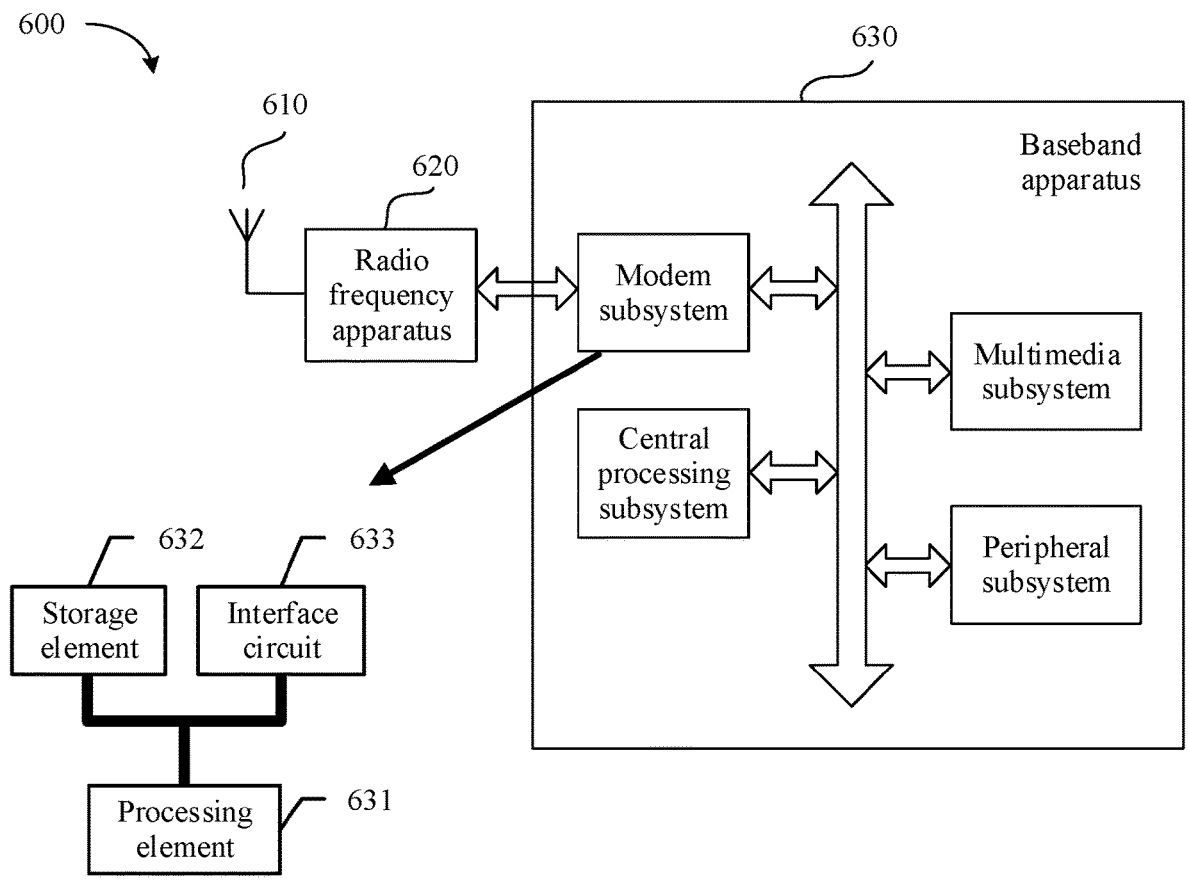
FIG. 15 is a schematic structural diagram of a terminal device according to an embodiment of this application.

FIG. 15 is a schematic structural diagram of a terminal device 600 according to an embodiment of this application. The terminal device 600 may be the terminal device in the foregoing embodiments, and may be configured to implement operations performed by the terminal device in the foregoing embodiments. As shown in FIG. 15, the terminal device 600 may include an antenna 610, a radio frequency part 620, and a signal processing part 630. The antenna 610 is connected to the radio frequency part 620. In a downlink direction, the radio frequency part 620 receives, through the antenna 610, information sent by a network device, and sends, to the signal processing part 630 for processing, the information sent by the network device. In an uplink direction, the signal processing part 630 processes information of the terminal device, and sends the information to the radio frequency part 620. The radio frequency part 620 processes the information of the terminal device, and then sends processed information to the network device through the antenna 610.

The signal processing part 630 may include a modem subsystem, configured to process data at each communications protocol layer. The signal processing part 630 may further include a central processing subsystem, configured to implement processing of an operating system and an application layer of the terminal device. In addition, the signal processing part 630 may further include another subsystem such as a multimedia subsystem or a peripheral subsystem. The multimedia subsystem is configured to control a camera or a screen display of the terminal device, and the peripheral subsystem is configured to implement a connection to another device. The modem subsystem may be a separately disposed chip. Optionally, the foregoing apparatus used for the terminal device may be located in the modem subsystem.

The modem subsystem may include one or more processing elements 631, for example, include one main control CPU and another integrated circuit. In addition, the modem subsystem may further include a storage element 632 and an interface circuit 633. The storage element 632 is configured to store data and a program. However, a program used to perform the methods performed by the terminal device in the foregoing methods may not be stored in the storage element 632, but is stored in a memory outside the modem subsystem, and is loaded and used by the modem subsystem when to be used. The interface circuit 633 is configured to communicate with another subsystem. The foregoing apparatus used for the terminal device may be located in the modem subsystem, and the modem subsystem may be implemented by a chip. The chip includes at least one processing element and interface circuit. The processing element is configured to perform the steps of any one of the methods performed by the terminal device. The interface circuit is configured to communicate with another apparatus.

In an embodiment, units of the terminal device that implement the steps of the foregoing methods may be implemented by a processing element scheduling a program. For example, the apparatus used for the terminal device includes a processing element and a storage element. The processing element invokes a program stored in the storage element, to perform the methods performed by the terminal device in the foregoing method embodiments. The storage element may be a storage element located on a same chip as the processing element, that is, an on-chip storage element.

In another embodiment, the program used to perform the methods performed by the terminal device in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal device in the foregoing method embodiments.

In still another embodiment, units of the terminal device that implement the steps of the foregoing methods may be configured as one or more processing elements. These processing elements are disposed on the modem subsystem. The processing element herein may be an integrated circuit, for example, one or more application-specific integrated circuits (ASIC), one or more digital signal processors (digital signal processor, DSP), one or more field programmable gate arrays (FPGA), or a combination of these types of integrated circuits. These integrated circuits may be integrated together to form a chip.

Units of the terminal device that implement the steps of the foregoing methods may be integrated together, and implemented in a form of a system on a chip (SOC). The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing embodiments, functions of some units may be implemented by the processing element invoking a program, and functions of some units may be implemented by the integrated circuit.

It can be learned that the foregoing apparatus used for the terminal device may include at least one processing element and interface circuit. The at least one processing element is configured to perform any one of the methods that are provided in the foregoing method embodiments and performed by the terminal device. The processing element may perform some or all the steps performed by the terminal device, in a first manner, to be specific, by executing the program stored in the storage element; or may perform some or all the steps performed by the terminal device, in a second manner, to be specific, by using a hardware integrated logic circuit in the processor element in combination with instructions; or may certainly perform some or all the steps performed by the terminal device, in a combination of the first manner and the second manner.

As described above, the processing element herein may be a general-purpose processor, for example, a central processing unit (CPU), or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general name of a plurality of storage elements.

Figure 16:
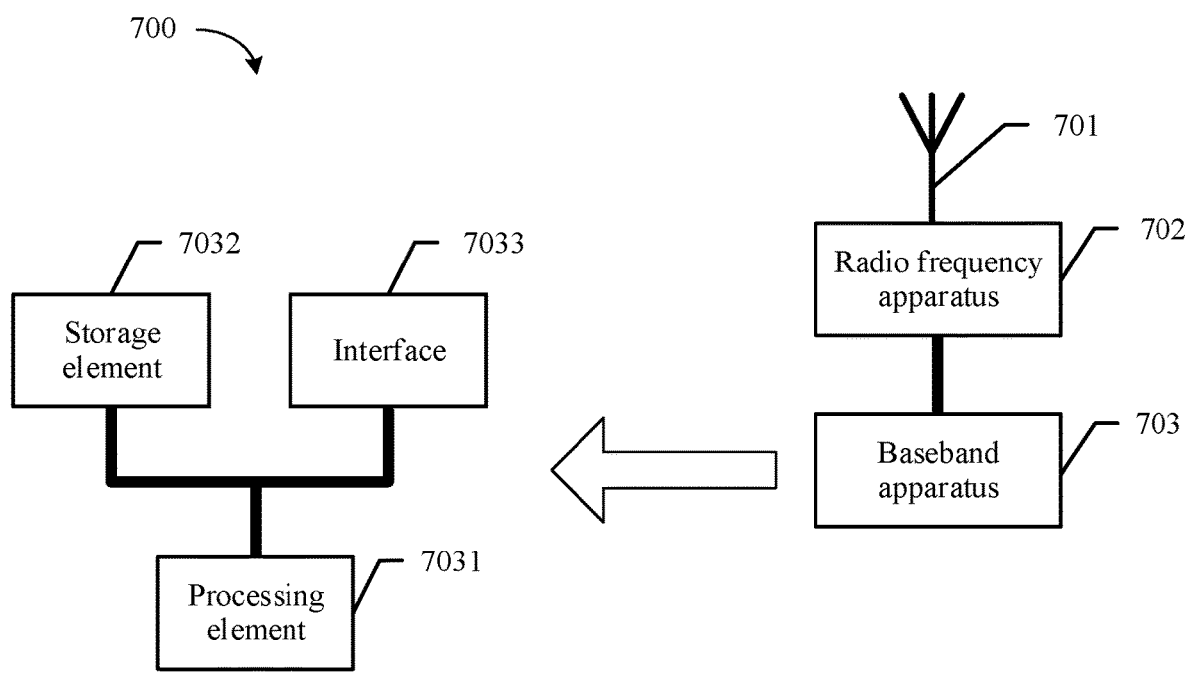
FIG. 16 is a schematic structural diagram of a network device according to an embodiment of this application.

FIG. 16 is a schematic structural diagram of a network device 700 according to an embodiment of this application. The network device 700 may be the network device in the foregoing embodiments, and may be configured to implement operations performed by the network device in the foregoing embodiments. As shown in FIG. 16, the network device 700 may include an antenna 701, a radio frequency apparatus 702, and a baseband apparatus 703. The antenna 701 is connected to the radio frequency apparatus 702. In an uplink direction, the radio frequency apparatus 702 receives, through the antenna 701, information sent by a terminal device, and sends, to the baseband apparatus 703 for processing, the information sent by the terminal device. In a downlink direction, the baseband apparatus 703 processes the information for the terminal device, and sends the information to the radio frequency apparatus 702. The radio frequency apparatus 702 processes the information for the terminal device, and then sends processed information to the terminal device through the antenna 701.

The baseband apparatus 703 may include one or more processing elements 7031, for example, include one main control CPU and another integrated circuit. In addition, the baseband apparatus 703 may further include a storage element 7032 and an interface 7033. The storage element 7032 is configured to store a program and data. The interface 7033 is configured to exchange information with the radio frequency apparatus 702, and the interface is, for example, a common public radio interface (CPRI). The foregoing apparatus used for the network device may be located in the baseband apparatus 703. For example, the foregoing apparatus used for the network device may be a chip on the baseband apparatus 703. The chip includes at least one processing element and interface circuit. The processing element is configured to perform the steps of any one of the methods performed by the network device. The interface circuit is configured to communicate with another apparatus.

In an embodiment, units of the network device that implement the steps of the foregoing methods may be implemented by a processing element scheduling a program. For example, the apparatus used for the network device includes a processing element and a storage element. The processing element invokes a program stored in the storage element, to perform the methods performed by the network device in the foregoing method embodiments. The storage element may be a storage element located on a same chip as the processing element, that is, an on-chip storage element, or may be a storage element located on a different chip from the processing element, that is, an off-chip storage element.

In another embodiment, units of the network device that implement the steps of the foregoing methods may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps of the foregoing methods may be integrated together, and implemented in a form of a system on a chip (SOC). For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing embodiments, functions of some units may be implemented by the processing element invoking a program, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all the steps performed by the network device, in a first manner, to be specific, by executing the program stored in the storage element; or may perform some or all the steps performed by the network device, in a second manner, to be specific, by using a hardware integrated logic circuit in the processor element in combination with instructions; or may certainly perform some or all the steps performed by the network device, in a combination of the first manner and the second manner.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general name of a plurality of storage elements.

Based on the methods provided in the embodiments of this application, this application further provides a computer program product. The computer program product includes computer program code. When the computer program code is run on a computer, the computer is enabled to perform the method in the embodiment shown in FIG. 2.

Based on the methods provided in the embodiments of this application, this application further provides a computer-readable medium. The computer-readable medium stores program code. When the program code is run on a computer, the computer is enabled to perform the method in the embodiment shown in FIG. 2.

Based on the methods provided in the embodiments of this application, this application further provides a system, including the network device and the terminal device.

All or some of the foregoing embodiments may be implemented by software, hardware, firmware, or any combination thereof. When software is used to implement the embodiments, some or all of the foregoing embodiments may be implemented in a form of a computer program product. The computer program product includes one or more computer instructions. When the computer program instructions are loaded or executed on a computer, all or some of the procedures or functions according to the embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving one or more uplink grants;
determining, based on a time-domain position of one or more uplink grant resources indicated by the one or more uplink grants and the one or more uplink grant resources, a first uplink grant resource from the one or more uplink grant resources for transmitting a first service data, wherein the determining the first uplink grant resource comprises:
determining first remaining time of the one or more uplink grant resources based on a time-domain end position of the one or more uplink grant resources indicated by the one or more uplink grants, wherein the first remaining time of each of the one or more uplink grant resources is a time interval between a time-domain end position of the each uplink grant resource and a timeout moment for the first service data, and
determining the first uplink grant resource from the one or more uplink grant resources, wherein the first remaining time of the first uplink grant resource is greater than or equal to a preconfigured delay threshold; and
transmitting the first service data on the first uplink grant resource.

2. The method according to claim 1, wherein the method further comprises:

receiving indication information of the preconfigured delay threshold.

3. The method according to claim 1, wherein the one or more uplink grant resources comprises a plurality of uplink grant resources, and the first uplink grant resource is a resource at a foremost time-domain position in the plurality of uplink grant resources.

4. The method according to claim 1, wherein the one or more uplink grant resources comprises a plurality of uplink grant resources, and the determining the first uplink grant resource further comprises:
determining second remaining time of the plurality of uplink grant resources based on time-domain start positions of the plurality of uplink grant resources indicated by a plurality of uplink grants, wherein the second remaining time of each of the plurality of uplink grant resources is a time interval between a time-domain start position of the each uplink grant resource and a start moment for performing logical channel prioritization (LCP) on a logical channel on which the first service data is located; and
determining the first uplink grant resource from the plurality of uplink grant resources, wherein the first uplink grant resource is a resource with minimum second remaining time in the plurality of uplink grant resources.

5. The method according to claim 1, wherein the one or more uplink grant resources comprises a plurality of uplink grant resources, and the determining the first uplink grant resource further comprises:
determining first remaining time of the plurality of uplink grant resources based on time-domain end positions of the plurality of uplink grant resources indicated by a plurality of uplink grants, wherein the first remaining time of each of the plurality of uplink grant resources is a time interval between a time-domain end position of the each uplink grant resource and a timeout moment before the first service data is correctly received;
determining candidate uplink grant resources from the plurality of uplink grant resources, wherein first remaining time of the candidate uplink grant resources is greater than or equal to a delay threshold that is preconfigured; and
determining the first uplink grant resource from the candidate uplink grant resources, wherein the first uplink grant resource is a resource at a foremost time-domain position in the candidate uplink grant resources.

6. The method according to claim 1, wherein the first uplink grant resource is capable of carrying a quantity of bits that is greater than or equal to a size of the first service data, and
the transmitting the first service data on the first uplink grant resource comprises:
transmitting all of the first service data on the first uplink grant resource.

7. The method according to claim 1, wherein the first uplink grant resource is capable of carrying a quantity of bits that is less than a size of the first service data, segmented transmission of the first service data is supported, and
the transmitting the first service data on the first uplink grant resource includes:
transmitting a part of the first service data on the first uplink grant resource.

8. The method according to claim 7, wherein the method further comprises:
transmitting a part or all of remaining data in the first service data on a second uplink grant resource, wherein the remaining data in the first service data is data not sent on the first uplink grant resource; the second uplink grant resource is a resource with minimum second remaining time in a plurality of uplink grant resources other than the first uplink grant resource, or the second uplink grant resource is a resource corresponding to an uplink grant that first arrives in a plurality of uplink grant resources other than the first uplink grant resource; and the second remaining time is a time interval between a time-domain start position of a uplink grant resource and a start moment for performing LCP on a logical channel on which the first service data is located.

9. A communications apparatus, comprising at least one processor, configured to invoke a program stored in a non-transitory machine readable storage medium, wherein the program, when executed by the processor, causes the apparatus to:
receive one or more uplink grants;
determine, based on a time-domain position of one or more uplink grant resources indicated by the one or more uplink grants and the one or more uplink grant resources, a first uplink grant resource from the one or more uplink grant resources for transmitting a first service data, and wherein the program, when executed by the processor, causes the apparatus to determine the first uplink grant resource by:
determining first remaining time of the one or more uplink grant resources based on a time-domain end position of the one or more uplink grant resources indicated by the one or more uplink grants, wherein the first remaining time of each of the one or more uplink grant resources is a time interval between a time-domain end position of the each uplink grant resource and a timeout moment for the first service data, and
determining the first uplink grant resource from the one or more uplink grant resources, wherein the first remaining time of the first uplink grant resource is greater than or equal to a preconfigured delay threshold; and
transmit the first service data on the first uplink grant resource.

10. The apparatus according to claim 9, wherein the program, when executed by the processor, causes the apparatus further to:
receive indication information of the preconfigured delay threshold.

11. The apparatus according to claim 9, wherein the one or more uplink grant resources comprises a plurality of uplink grant resources, and the first uplink grant resource is a resource at a foremost time-domain position in the plurality of uplink grant resources.

12. The apparatus according to claim 9, wherein the one or more uplink grant resources comprises a plurality of uplink grant resources, and the determining the first uplink grant resource further comprises:
determining second remaining time of the plurality of uplink grant resources based on time-domain start positions of the plurality of uplink grant resources indicated by a plurality of uplink grants, wherein the second remaining time of each of the plurality of uplink grant resources is a time interval between a time-domain start position of the each uplink grant resource and a start moment for performing logical channel prioritization (LCP) on a logical channel on which the first service data is located; and determining the first uplink grant resource from the plurality of uplink grant resources, wherein the first uplink grant resource is a resource with minimum second remaining time in the plurality of uplink grant resources.

13. The apparatus according to claim 9, wherein the one or more uplink grant resources comprises a plurality of uplink grant resources, and the determining the first uplink grant resource further comprises:
- determining first remaining time of the plurality of uplink grant resources based on time-domain end positions of the plurality of uplink grant resources indicated by a plurality of uplink grants, wherein the first remaining time of each of the plurality of uplink grant resources is a time interval between a time-domain end position of the each uplink grant resource and a timeout moment before the first service data is correctly received;
- determining candidate uplink grant resources from the plurality of uplink grant resources, wherein first remaining time of the candidate uplink grant resources is greater than or equal to a delay threshold that is preconfigured; and
- determining the first uplink grant resource from the candidate uplink grant resources, wherein the first uplink grant resource is a resource at a foremost time-domain position in the candidate uplink grant resources.

14. The apparatus according to claim 9, wherein the first uplink grant resource is capable of carrying a quantity of bits that is greater than or equal to a size of the first service data, and
- the transmitting the first service data on the first uplink grant resource comprises:
- transmitting all of the first service data on the first uplink grant resource.

15. The apparatus according to claim 9, wherein the first uplink grant resource is capable of carrying a quantity of bits that is less than a size of the first service data, segmented transmission of the first service data is supported, and
- the transmitting the first service data on the first uplink grant resource includes:
- transmitting a part of the first service data on the first uplink grant resource.

16. The apparatus according to claim 15, wherein the program, when executed by the processor, causes the apparatus further to:
- transmit a part or all of remaining data in the first service data on a second uplink grant resource, wherein the remaining data in the first service data is data not sent on the first uplink grant resource; the second uplink grant resource is a resource with minimum second remaining time in a plurality of uplink grant resources other than the first uplink grant resource, or the second uplink grant resource is a resource corresponding to an uplink grant that first arrives in a plurality of uplink grant resources other than the first uplink grant resource; and the second remaining time is a time interval between a time-domain start position of a uplink grant resource and a start moment for performing LCP on a logical channel on which the first service data is located.

17. The apparatus according to claim 14, wherein the program, when executed by the processor, causes the apparatus further to:
- receiving first indication information, wherein the first indication information indicates whether segmented transmission of the first service data is supported.

18. A non-transitory computer-readable storage medium, comprising a program, wherein when the program is executed by a processor, the processor is caused to perform:
- receive one or more uplink grants;
- determine, based on a time-domain position of one or more uplink grant resources indicated by the one or more uplink grants and the one or more uplink grant resources, a first uplink grant resource from the one or more uplink grant resources for transmitting a first service data, wherein the processor caused to determine the first uplink grant resource comprises the processor caused to:
  - determine first remaining time of the one or more uplink grant resources based on a time-domain end position of the one or more uplink grant resources indicated by the one or more uplink grants, wherein the first remaining time of each of the one or more uplink grant resources is a time interval between a time-domain end position of the each uplink grant resource and a timeout moment for the first service data, and
  - determine the first uplink grant resource from the one or more uplink grant resources, wherein the first remaining time of the first uplink grant resource is greater than or equal to a preconfigured delay threshold; and
- transmit the first service data on the first uplink grant resource.

\* \* \* \* \*